(12) United States Patent
Han et al.

(10) Patent No.: US 11,460,948 B2
(45) Date of Patent: Oct. 4, 2022

(54) TOUCH PANEL AND PREPARATION METHOD THEREOF, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Linhong Han, Beijing (CN); Tingliang Liu, Beijing (CN); Yi Zhang, Beijing (CN); Wenxiao Niu, Beijing (CN); Shikai Qin, Beijing (CN); Youngyik Ko, Beijing (CN)

(73) Assignees: Chengdu BOE Optoelectronics Technology Co., Ltd., Sichuan (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/200,929

(22) Filed: Mar. 15, 2021

(65) Prior Publication Data

US 2022/0066609 A1 Mar. 3, 2022

(30) Foreign Application Priority Data

Aug. 31, 2020 (CN) .......................... 202010898528.0

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05); *G06F 2203/04103* (2013.01); *G06F 2203/04107* (2013.01); *G06F 2203/04111* (2013.01)

(58) Field of Classification Search
CPC .. G06F 3/04164; G06F 3/0412; G06F 3/0446; G06F 2203/04107; G06F 2203/04111
See application file for complete search history.

(56) References Cited

U.S. PATENT DOCUMENTS

| | | | |
|---|---|---|---|
| 2015/0253897 A1* | 9/2015 | Liang | H01B 5/00 174/126.1 |
| 2019/0018050 A1* | 1/2019 | Wang | G06F 3/04164 |
| 2021/0181888 A1* | 6/2021 | Yan | G06F 3/0446 |

FOREIGN PATENT DOCUMENTS

CN 110187797 A * 8/2019 ........... G06F 3/0412

* cited by examiner

*Primary Examiner* — Liliana Cerullo
(74) *Attorney, Agent, or Firm* — Ling Wu; Stephen Yang; Ling and Yang Intellectual Property

(57) ABSTRACT

Provided are a touch panel, a preparation method thereof, and a display apparatus. The touch panel includes: a touch region, a binding region on one side of the touch region, and an edge region on the other side of the touch region. The touch region at least includes M rows of first touch units and N columns of second touch units, the binding region at least includes a binding pin region, and the edge region at least includes a plurality of touch leads; wherein first terminals of the plurality of touch leads are respectively connected to the M rows of first touch units and the N columns of second touch units, and second terminals of the plurality of touch leads extend to the binding region and are correspondingly connected to a plurality of pins in the binding pin region; M and N are positive integers greater than 2.

3 Claims, 11 Drawing Sheets

TOUCH PANEL AND PREPARATION METHOD THEREOF, AND DISPLAY APPARATUS

CROSS-REFERENCE TO RELATED APPLICATION

The present application claims the priority of Chinese Patent Application No. 202010898528.0 filed to the CNIPA on Aug. 31, 2020, the content of which is hereby incorporated by reference.

TECHNICAL FIELD

The embodiments of present disclosure relate to, but are not limited to, the field of display technology, in particular to a touch panel, a preparation method of the touch panel, and a display apparatus.

BACKGROUND

With rapid development of display technology, touch screens have gradually spread throughout people's lives. Touch screens may be categorized into Add on Mode type, On Cell type, In Cell type and the like according to their composition structures, and may be categorized into capacitive type, resistive type, infrared type, surface acoustic wave type and the like according to their operation principles. Capacitive On Cell type is a touch structure formed on a light exit surface of a display screen, and the Capacitive On Cell type has gradually became a mainstream technology due to advantages such of simple structure, small thickness, high transmittance, etc.

An organic light-emitting diode (abbreviated as OLED) is an active light-emitting display apparatus, and has advantages of self-luminescence, wide view angle, high contrast, low power consumption, extremely high response speed, etc. With continuous development of the display technology, a flexible display apparatus with the OLED as a light-emitting device and thin film transistor (TFT) for signal control has become the mainstream product in the display field. According to product requirements such as flexible folding and narrow bezel, etc., the existing touch control structure based on OLED adopts a structural form of Flexible Multi-Layer On Cell (FMLOC). The flexible touch substrate is provided on an encapsulation layer of an OLED backplane and has advantages of lightness, thinness and foldability, which can meet the product requirements of flexible folding and narrow bezel, etc.

With a gradual increase in sizes of display apparatuses and emergence of folding screens, touch panels have the problem of high production costs.

SUMMARY

The following is a summary of subject matter described in detail herein. This summary is not intended to limit the protection scope of the claims.

Embodiments of the present disclosure provide a touch panel, a preparation method of the touch panel, and a display apparatus.

In one aspect, an exemplary embodiment of the present disclosure provides a touch panel including: a touch region, a binding region on one side of the touch region, and an edge region on the other side of the touch region. The touch region at least includes M rows of first touch units and N columns of second touch units, the binding region at least includes a binding pin region, and the edge region at least includes a plurality of touch leads; wherein first terminals of the plurality of touch leads are respectively connected to the M rows of first touch units and the N columns of second touch units, and second terminals of the plurality of touch leads extend to the binding region and are correspondingly connected to a plurality of pins of the binding pin region; and M and N are positive integers greater than 2.

In an exemplary embodiment, along a direction parallel to an edge of the binding region, the binding pin region includes a first pin region located on a first side of the binding region and a second pin region located on a second side of the binding region, the edge of the binding region is an edge of the binding region adjacent to the touch region; a part of touch leads in the edge region extend to the first side of the binding region and are correspondingly connected to a plurality of pins of the first pin region or the second pin region, and another part of touch leads in the edge region extend to the second side of the binding region and are correspondingly connected to a plurality of pins of the first pin region or the second pin region.

The touch panel further includes a first array test unit and a second array test unit which are located on one side of the binding pin region away from the touch region; and a plurality of test terminals in the first array test unit are correspondingly connected to a plurality of pins of the first pin region, and a plurality of test terminals in the second array test unit are correspondingly connected to a plurality of pins of the second pin region.

In an exemplary embodiment, the plurality of touch leads extending to the first side of the binding region and correspondingly connected to the plurality of pins of the first pin region include: M first row leads, N1 first column leads, and N1 third column leads; the M first row leads are correspondingly connected to first terminals of the M rows of first touch units in the touch region, and the N1 first column leads are correspondingly connected to first terminals of the N1 columns of second touch units in the touch region, and the N1 third column leads are correspondingly connected to second terminals of the N1 columns of second touch units in the touch region.

The plurality of touch leads extending to the second side of the binding region and correspondingly connected to the plurality of pins of the second pin region include: M second row leads, N2 second column leads, and N2 fourth column leads; wherein the M second row leads are correspondingly connected to second terminals of the M rows of first touch units in the touch region, the N2 second column leads are correspondingly connected to first terminals of N2 columns of second touch units in the touch region, and the N2 fourth column leads are correspondingly connected to second terminals of the N2 columns of second touch units in the touch region, and N1+N2=N.

The pins correspondingly connected to the first array test unit include: pins in the first pin region which are connected to M1 first row leads and the N1 first column leads; or, pins in the first pin region which are connected to the M1 first row leads and the N1 third column leads;

The pins correspondingly connected to the second array test unit include: pins in the second pin region which are connected to M2 second row leads and N2 second column leads; or, pins in the second pin region which are connected to the M2 second row leads and N2 fourth column leads, and M1+M2=M.

In an exemplary embodiment, the N1 first column leads and the N1 third column leads are leads connected to the first to the N1-th columns of the second touch units in the touch region, and the N2 second column leads and the N2 fourth column leads are leads connected to the (N1+1)-th to the Nth columns of the second touch units in the touch region.

The M1 first row leads are leads connected to the first to the M1-th rows of the first touch units from in the touch region, and the M2 second row leads are leads connected to the (M1+1)-th to the M-th rows of the first touch units in the touch region; or, the M2 second row leads are leads connected to the first to the M2-th rows of the first touch units in the touch region, and the M1 first row leads are leads connected to the (M1+1)-th to the M-th rows of the first touch units in the touch region.

In an exemplary embodiment, the plurality of touch leads extending to the first side of the binding region and correspondingly connected to the plurality of pins of the first pin region include: M first row leads and N first column leads; wherein the M first row leads are correspondingly connected to first terminals of the M rows of first touch units in the touch region, and the N first column leads are correspondingly connected to first terminals of the N columns of second touch units in the touch region.

The plurality of touch leads extending to the second side of the binding region and correspondingly connected to the plurality of pins of the second pin region include: M second row leads and N fourth column leads; wherein, the M second row leads are correspondingly connected to second terminals of the M rows of first touch units in the touch region, and the N fourth column leads are correspondingly connected to second terminals of the N columns of second touch units in the touch region.

The pins correspondingly connected to the first array test unit include: pins in the first pin region which are connected to the M first row leads; the pins correspondingly connected to the second array test unit include: pins in the second pin region which are connected to the N fourth column leads.

Optionally, the pins correspondingly connected to the first array test unit include: pins in the first pin region which are connected to the N first column leads; the pins correspondingly connected to the second array test unit include: pins in the second pin region which are connected to the M second row leads.

In an exemplary embodiment, the plurality of touch leads extending to the first side of the binding region and correspondingly connected to the plurality of pins of the first pin region include: M first row leads and N third column leads; wherein the M first row leads are correspondingly connected to first terminals of the M rows of first touch units in the touch region, and the N third column leads are correspondingly connected to second terminals of the N columns of second touch units in the touch region.

The plurality of touch leads extending to the second side of the binding region and correspondingly connected to the plurality of pins of the second pin region include: M second row leads and N second column leads; wherein, the M second row leads are correspondingly connected to second terminals of the M rows of first touch units in the touch region, and the N second column leads are correspondingly connected to first terminals of the N columns of second touch units in the touch region.

The pins correspondingly connected to the first array test unit include: pins in the first pin region which are connected to the M first row leads; the pins correspondingly connected to the second array test unit include: pins in the second pin region which are connected to the N second column leads.

Optionally, the pins correspondingly connected to the first array test unit include: pins in the first pin region which are connected to the N third column leads; the pins correspondingly connected to the second array test unit include: pins in the second pin region which are connected to the M second row leads.

In an exemplary embodiment, the plurality of touch leads extending to the first side of the binding region and correspondingly connected to the plurality of pins of the second pin region include: M third row leads, and first terminals of the M third row leads are correspondingly connected to first terminals of the M rows of first touch units, and second terminals of the M third row leads extend to the first side of the binding region and are connected to first terminals of M patch cords; wherein second terminals of the M patch cords extend from the first side of the binding region to the second side of the binding region, and are correspondingly connected to a plurality of pins of the second pin region.

The plurality of touch leads extending to the second side of the binding region and correspondingly connected to the plurality of pins of the second pin region include: N fifth column leads, and first terminals of the N fifth column leads are correspondingly connected to first terminals and second terminals of the N columns of second touch units respectively, and second terminals of the N fifth column leads extend to the second side of the binding region, and are correspondingly connected to multiple pins of the second pin region.

Optionally, the plurality of touch leads extending to the first side of the binding region and correspondingly connected to the plurality of pins of the first pin region include: M third row leads; wherein first terminals of the M third row leads are correspondingly connected to the first terminals of the M rows of first touch units, and second terminals of the M first row leads extend to the first side of the binding region, and are correspondingly connected to multiple pins of the first pin region.

The plurality of touch leads extending to the second side of the binding region and correspondingly connected to the plurality of pins of the first pin region include: N fifth column leads, the first terminals of the N fifth column leads are respectively connected to the first terminals and the second terminals of the N columns of second touch units, and the second terminals of the N fifth column leads extend to the second side of the binding region and are connected to first terminals of N patch cords; wherein second terminals of the N patch cords extend from the second side of the binding region to the first side of the binding region, and are correspondingly connected to multiple pins of the first pin region.

In an exemplary embodiment, the plurality of touch leads extending to the first side of the binding region and correspondingly connected to the plurality of pins of the second pin region include: N sixth column leads, and first terminals of the N sixth column leads are correspondingly connected to first terminals and second terminals of the N columns of second touch units respectively, and second terminals of the N sixth column leads extend to the first side of the binding region and are connected to first terminals of M patch cords; wherein second terminals of the M patch cords extend from the first side of the binding region to the second side of the binding region, and are correspondingly connected to a plurality of pins of the second pin region.

The plurality of touch leads extending to the second side of the binding region and correspondingly connected to the plurality of pins of the second pin region include: M fourth row leads; wherein the first terminals of the M fourth row leads are correspondingly connected to second terminals of the M rows of first touch units, and second terminals of the M fourth row leads extend to the second side of the binding region, and are correspondingly connected to a plurality of pins of the second pin region.

Optionally, the plurality of touch leads extending to the first side of the binding region and correspondingly connected to the plurality of pins of the first pin region include: N sixth column leads, and the first terminals of the N sixth column leads are correspondingly connected to the first terminals and the second terminals of the N columns of second touch units respectively, and the second terminals of the N sixth column leads extend to the first side of the binding region, and are correspondingly connected to multiple pins of the first pin region.

The plurality of touch leads extending to the second side of the binding region and correspondingly connected to the plurality of pins of the first pin region include: M fourth row leads; wherein the first terminals of the M fourth row leads are correspondingly connected to the second terminals of the M rows of first touch units, and the second terminals of the M fourth row leads extend to the second side of the binding region and are connected to the first terminals of the M patch cords; wherein the second terminals of the M patch cords extend from the second side of the binding region to the first side of the binding region, and are correspondingly connected to multiple pins of the first pin region.

In an exemplary embodiment, along a direction away from the touch region, the binding region at least includes: a first fanout region, a bending region, a second fanout region, a driver chip region and a binding pin region which are sequentially disposed; the patch cords are disposed in the second fanout region, or the patch cords are disposed in an outer lead bonding region between the driver chip region and the binding pin region.

In an exemplary embodiment, in a plane perpendicular to the binding region, the second fanout region includes: a composite insulating layer disposed on a base substrate, a data transmission line disposed on the composite insulating layer, a first planarization layer covering the data transmission line, a first power supply line disposed on the first planarization layer, a second planarization layer covering the first power supply line, and a patch cord disposed on the second planarization layer; wherein an orthographic projection of the first power supply line on the base substrate includes an orthographic projection of the patch cord on the base substrate.

In an exemplary embodiment, in a plane perpendicular to the binding region, the outer lead bonding region includes: a composite insulating layer disposed on a base substrate, a first planarization layer disposed on the composite insulating layer, a signal transmission line disposed on the first planarization layer, a second planarization layer covering the signal transmission line, and a patch cord disposed on the second planarization layer.

In an exemplary embodiment, in a plane perpendicular to the binding region, the outer lead bonding region includes: a composite insulating layer disposed on a base substrate; a signal connection line disposed on the composite insulating layer; a first planarization layer covering the signal connection line, wherein the first planarization layer is provided thereon with a first connection via exposing a first terminal of the signal connection line and a second connection via exposing a second terminal of the signal connection line; a first signal transmission line, a second signal transmission line and a shielding panel which are disposed on the first planarization layer, wherein one terminal of the first signal transmission line away from the outer lead bonding region is connected to a terminal of the driver chip region, and the other terminal is connected to the first terminal of the signal connection line through the first connection via; one terminal of the second signal transmission line away from the outer lead bonding region is connected to a pin of the binding pin region, and the other terminal is connected to the second terminal of the signal connection line through the second connection via; the shielding panel is disposed between the first signal transmission line and the second signal transmission line; a second planarization layer covering the first signal transmission line, the second signal transmission line and the shielding panel; a patch cord disposed on the second planarization layer; an orthographic projection of the shielding panel on the base substrate includes an orthographic projection of the patch cord on the base substrate.

In another aspect, an exemplary embodiment of the present disclosure further provides a display apparatus, including the aforementioned touch panel.

In another aspect, the exemplary embodiment of the present disclosure further provides a preparation method of a touch panel, which includes a display region and a binding region located on one side of the display region; wherein along a direction away from a touch region, the binding region at least includes: a first fanout region, a bending region, a second fanout region, a driver chip region and a binding pin region which are sequentially disposed; along a direction parallel to an edge of the binding region, the binding pin region includes: a first pin region located on a first side of the binding region and a second pin region located on a second side of the binding region, wherein the edge of the binding region is an edge of the binding region adjacent to the touch region.

The preparation method includes: forming multiple patch cords in the second fanout region of the binding region; or, forming multiple patch cords in an outer lead bonding region between the driver chip region and the binding pin region.

The plurality of patch cords are configured such that first terminals of the plurality of patch cords are correspondingly connected to multiple touch leads extending to the first side of the binding region, and second terminals of the plurality of patch cords extend from the first side of the binding region to the second side of the binding region and are correspondingly connected to multiple pins of the second pin region.

Optionally, the plurality of patch cords are configured such that the first terminals of the plurality of patch cords are correspondingly connected to multiple touch leads extending to the second side of the binding region, and the second terminals of the plurality of patch cords extend from the second side of the binding region to the first side of the binding region and are correspondingly connected to multiple pins of the first pin region.

In an exemplary embodiment, forming the plurality of patch cords in the second fanout region of the binding region includes: forming a composite insulating layer on a base substrate; forming a data transmission line on the composite insulating layer; forming a first planarization layer covering the data transmission line; forming a first power supply line on the first planarization layer; forming a second planarization layer covering the first power supply line; and forming multiple patch cords on the second planarization layer, wherein an orthographic projection of the first power supply line on the base substrate includes an orthographic projection of the plurality of patch cords on the base substrate.

In an exemplary embodiment, forming the plurality of patch cords in the outer lead bonding region between the driver chip region and the binding pin region includes: forming a composite insulating layer on a base substrate and forming a first planarization layer disposed on the composite insulating layer; forming a signal transmission line on the first planarization layer; forming a second planarization layer covering the signal transmission line; and forming multiple patch cords on the second planarization layer.

In an exemplary embodiment, forming the plurality of patch cords in the outer lead bonding region between the driver chip region and the binding pin region includes: forming a composite insulating layer on a base substrate; forming a signal connection line on the composite insulating layer; forming a first planarization layer covering the signal connection line, which is provided thereon with a first connection via exposing a first terminal of the signal connection line and a second connection via exposing a second terminal of the signal connection line; forming a first signal transmission line, a second signal transmission line and a shielding panel on the first planarization layer, wherein one terminal of the first signal transmission line away from the outer lead bonding region is connected to a terminal of the driver chip region, and the other terminal is connected to the first terminal of the signal connection line through the first connection via; one terminal of the second signal transmission line away from the outer lead bonding region is connected to a pin of the binding pin region, and the other terminal is connected to the second terminal of the signal connection line through the second connection via; the shielding panel is disposed between the first signal transmission line and the second signal transmission line; forming a second planarization layer covering the first signal transmission line, the second signal transmission line and the shielding panel; and forming a patch cord on the second planarization layer; wherein an orthographic projection of the shielding panel on the base substrate includes an orthographic projection of the patch cord on the base substrate.

Other aspects will become apparent upon reading and understanding the drawings and the detailed description.

BRIEF DESCRIPTION OF DRAWINGS

Drawings are used provide a further understanding of technical solutions of the present disclosure, form a part of the specification, and explain the technical solutions of the present disclosure together with embodiments of the present disclosure, while they do not constitute a limitation on the technical solutions of the present disclosure. Shapes and sizes of the components in the drawings do not reflect true proportions, and are only for a purpose of schematically illustrating contents of the present disclosure.

DETAILED DESCRIPTION

Figure 1:
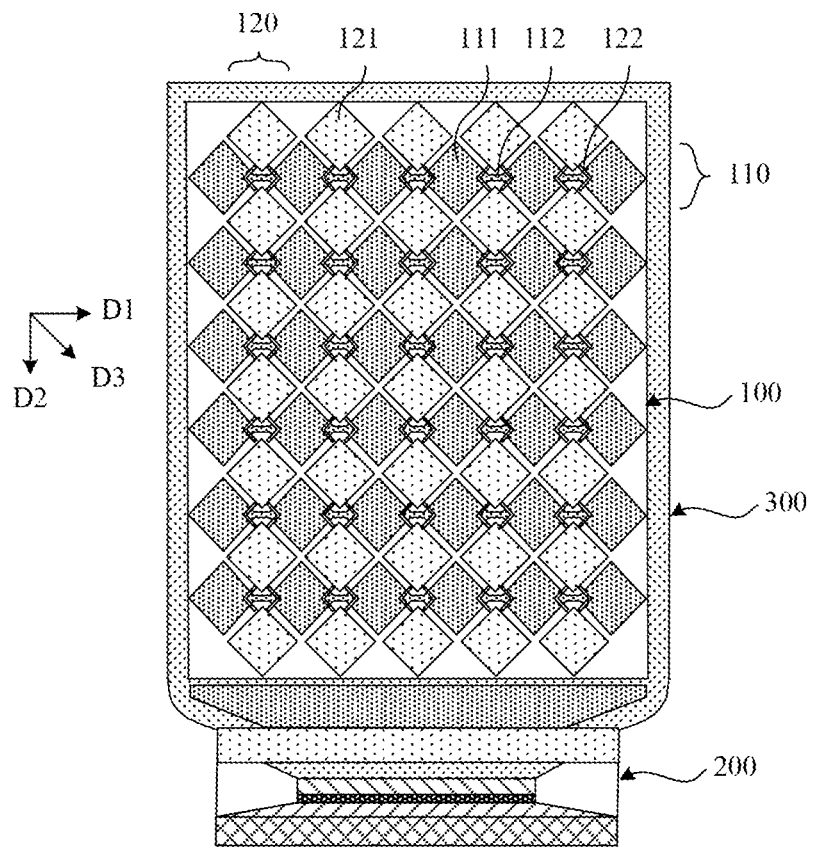
FIG. 1 is a schematic diagram of a structure of a touch panel according to an exemplary embodiment of the present disclosure.

Hereinafter, embodiments of the present disclosure will be described in detail with reference to the accompanying drawings. The embodiments may be implemented in a number of different forms. Those of ordinary skills in the art will readily understand the fact that implementations and contents may be transformed into a variety of forms without departing from the spirit and scope of the present disclosure. Therefore, the present disclosure should not be construed as being limited only to what is described in the following embodiments. Embodiments in the present disclosure and features in the embodiments may be combined with each other arbitrarily if there is no conflict.

In the drawings, sizes of constituent elements, or thicknesses of layers or regions, are sometimes exaggerated for sake of clarity. Therefore, an implementation of the present disclosure is not necessarily limited to the sizes shown. The shape and sizes of components in the drawings do not reflect true proportions. In addition, the drawings schematically show ideal examples, and an implementation of the present disclosure is not limited to the shapes or values shown in the drawings.

The ordinal numbers "first", "second", "third" and the like in this specification are used to avoid confusion between constituent elements, but not to constitute limitations on quantities.

In this specification, for sake of convenience, wordings such as "central", "upper", "lower", "front", "rear", "vertical", "horizontal", "top", "bottom", "inner", "outer" and the like describe the orientation or positional relations of constituent elements with reference to the drawings, which are only for ease of description in this specification and for simplification of the description, rather than indicating or implying that the apparatus or element referred to must have a specific orientation, or must be constructed and operated in a particular orientation, and therefore cannot be construed as limitations on the present disclosure. The positional relations of the constituent elements may be appropriately changed according to the direction in which each constituent element is described. Therefore, they are not limited to the wordings in the specification, and may be replaced appropriately according to the situations.

In this specification, terms "install", "connect" and "couple" shall be understood in a broad sense unless otherwise explicitly specified and defined. For example, a connection may be a fixed connection, or may be a detachable connection, or an integrated connection; it may be a mechanical connection, or may be an electrical connection; it may be a direct connection, or may be an indirect connection through middleware, or may be an internal connection between two elements. Those of ordinary skills in the art can understand the specific meanings of the above mentioned terms in the present disclosure according to specific situations.

In this specification, a transistor refers to an element including at least three terminals, namely a gate electrode, a drain electrode and a source electrode. The transistor has a channel region between the drain electrode (drain terminal, drain region or drain electrode) and the source electrode (source electrode terminal, source region or source electrode), and a current can flow through the drain electrode, the channel region and the source electrode. In this specification, a channel region refers to a region through which the current mainly flows.

In this specification, a first electrode may be a drain electrode and a second electrode may be a source electrode, or the first electrode may be a source electrode and the second electrode may be a drain electrode. In a case where transistors with opposite polarities are used or a current direction is changed in operation of a circuit, a function of the "source electrode" and a function of the "drain electrode" sometimes are interchangeable. Therefore, in this specification, "source electrodes" and "drain electrodes" are interchangeable.

In this specification, an "electrical connection" includes a case where constituent elements are connected together through an element having a certain electrical action. The "element having a certain electrical action" is not particularly limited as long as it can transmit and receive electrical signals between the connected constituent elements. Examples of the "element having a certain electrical action" include not only electrodes and wirings, but also switching elements such as transistors, resistors, inductors, capacitors, and other elements having various functions.

In this specification, "parallel" refers to a state in which two straight lines form an angle above −10 degrees and below 10 degrees, and thus also includes a state in which the angle is above −5 degrees and below 5 degrees. In addition, "vertical" refers to a state in which two straight lines form an angle above 80 degrees below 100 degrees, and thus also includes a state in which the angle is above 85 degrees and below 95 degrees.

In this specification, "film" and "layer" are interchangeable. For example, sometimes a "conductive layer" may be replaced with a "conductive film". Similarly, an "insulating film" may sometimes be replaced with an "insulating layer".

In the present specification, "about" in the present disclosure means that there is no strict limit for a value, and values within an error range during processes and measurement are allowed.

Touch panels of capacitive On Cell type are mainly divided into a Mutual Capacitance structure and a Self Capacitance structure. In the mutual capacitance structure, mutual capacitance is formed by overlapping a first touch electrode and a second touch electrode, and a change of the mutual capacitance is used for position detection. In the self capacitance structure, mutual capacitance is formed by the touch electrode and the human body, and the change of the self capacitance is used for position detection. A self capacitance touch panel has a single-layer structure with features such as low power consumption and simple structure, while a mutual capacitance touch panel has a multi-layer structure with features such as multi-touch.

The touch panel of an exemplary embodiment of the present disclosure may be applied to a display apparatus, wherein the display apparatus may include a display substrate disposed on a base substrate and a touch panel disposed on the display substrate. The display substrate may be a liquid crystal display (LCD) substrate, an organic light emitting diode (OLED) substrate, a plasma display apparatus (PDP) substrate, or an electrophoretic display (EPD) substrate. In an exemplary embodiment, the display substrate is an OLED substrate, and a touch panel is disposed on the display substrate to form a Flexible Multi Layer On Cell (abbreviated as FMLOC) structure in which a display structure is integrated with a touch structure, and the FMLOC structure has advantages such as thinness and foldability, and can meet the product demands of flexible folding, narrow bezel etc.

FIG. 1 is a schematic diagram of a structure of a touch panel according to an exemplary embodiment of the present disclosure. The touch panel is disposed on a display substrate to form an FMLOC structure. In a plane parallel to the touch panel, the touch panel includes an effective region (or effective area, AA), a binding region on one side of the effective region, and an edge region on the other side of the effective region. For the stacked display substrate and touch panel, the effective region may be either a touch region or a display region, and both the touch region and the display region in the following description refer to effective regions. In an exemplary embodiment, the touch region 100 at least includes multiple touch electrodes disposed regularly, the edge region 300 at least includes multiple touch leads, and the binding region 200 at least includes pins connecting the touch leads to an external control device.

In an exemplary embodiment, the touch panel may have a mutual capacitance structure. The touch region 100 may include multiple first touch units 110 and multiple second touch units 120, wherein the first touch units 110 have a linear shape extending along a first direction D1 and the plurality of first touch units 110 are disposed in sequence along a second direction D2. The second touch units 120 have a linear shape extending along the second direction D2 and the plurality of second touch units 120 are disposed in sequence along the first direction D1, wherein the first direction D1 intersects the second direction D2. Each first touch unit 110 includes multiple first touch electrodes 111 and first connection parts 112 which are disposed sequentially along the first direction D1, and the first touch electrodes 111 and the first connection part 112 are alternately disposed and sequentially connected. Each second touch unit 120 includes multiple second touch electrodes 121 disposed sequentially along the second direction D2, and the plurality of second touch electrodes 121 are disposed at intervals, wherein adjacent second touch electrodes 121 are connected to each other via second connection parts 122. In an exemplary embodiment, a film layer where the second connection parts 122 are located is different from a film layer where the first touch electrodes 111 and the second touch electrodes 121 are located. The first touch electrodes 111 and the second touch electrodes 121 are alternately disposed along a third direction D3, wherein the third direction D3 intersects the first direction D1 and the second direction D2.

In an exemplary embodiment, the plurality of first touch electrodes 111, the plurality of second touch electrodes 121, and the plurality of first connection parts 112 may be disposed on a same layer, i.e., a touch layer and may be formed by a same patterning process, and the first touch electrodes 111 and the first connection parts 112 may be connected to each other in an integrated structure. The second connection parts 122 may be disposed on a bridge layer, and adjacent second touch electrodes 121 are connected to each other through vias. An insulating layer is disposed between the touch layer and the bridge layer. In some possible implementations, the plurality of first touch electrodes 111, the plurality of second touch electrodes 121 and the plurality of second connection parts 122 may be disposed on the same layer, i.e., the touch layer, wherein the second touch electrodes 121 and the second connection parts 122 may be connected to each other in an integrated structure. The first connection parts 112 may be disposed on the bridge layer and adjacent first touch electrodes 111 are connected to each other through vias. In an exemplary embodiment, the first touch electrodes may be driver electrodes (Tx) and the second touch electrodes may be sensor electrodes (Rx). Or, the first touch electrodes may be sensor electrodes (Rx) and the second touch electrodes may be driver electrodes (Tx).

In an exemplary embodiment, the first touch electrodes 111 and the second touch electrodes 121 may have rhombic shapes, such as regular rhombic shapes, horizontally long rhombic shapes, or longitudinally long rhombic shapes. In some possible implementations, the first touch electrodes 111 and the second touch electrodes 121 may have any one or more of shapes of triangles, squares, trapezoids, parallelograms, pentagons, hexagons and other polygons, which are not limited in the present disclosure In an exemplary embodiment, the first touch electrodes 111 and the second touch electrodes 121 may be in the form of transparent conductive electrodes. In an exemplary embodiment, the first touch electrodes 111 and the second touch electrodes 121 may be in the form of a metal mesh. The metal mesh is formed by multiple interweaving metal wires and includes multiple mesh pattern units, wherein the mesh pattern units are polygons formed by multiple metal wires. The first touch electrodes 111 and the second touch electrodes 121 with a layout of metal mesh have the advantages of low resistance, small thickness, fast response speed and the like.

Figure 2:
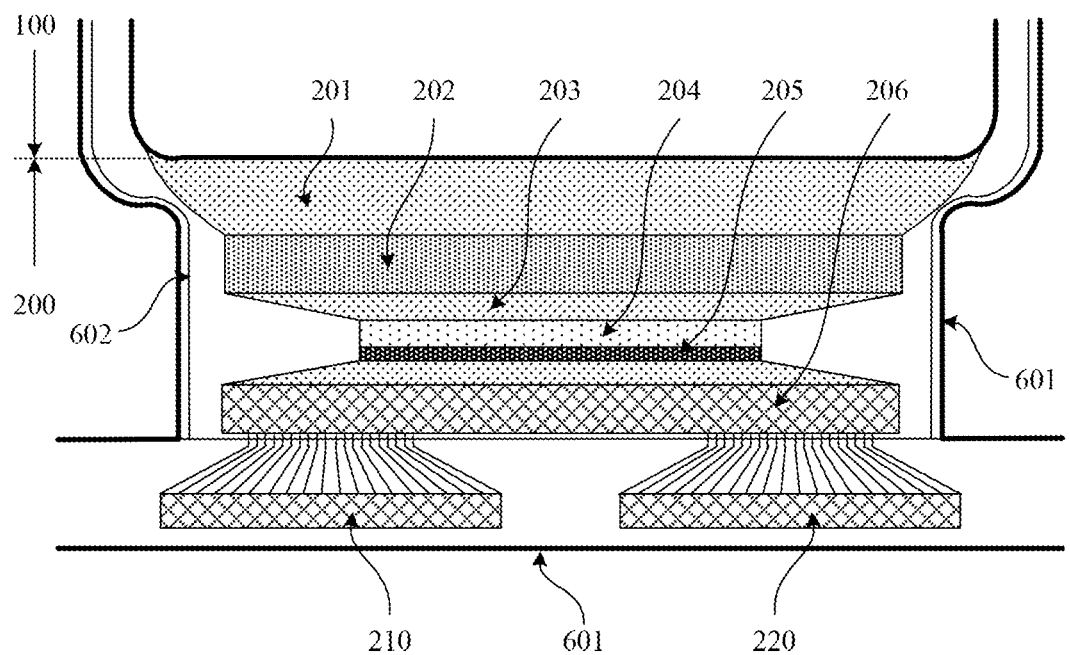
FIG. 2 is a schematic diagram of a structure of a binding region according to an exemplary embodiment of the present disclosure.

FIG. 2 is a schematic diagram of a structure of a binding region according to an exemplary embodiment of the present disclosure. As shown in FIG. 2, in an exemplary embodiment, the binding region 200 is located on one side of the touch region 100, and along a direction away from the touch region 100 (the second direction D2), the binding region 200 may include a first fanout region 201, a bending region 202, a second fanout region 203, an antistatic region 204, a driver chip region 205, and a binding pin region 206 which are sequentially disposed. The first fanout region 201 may be provided with a signal transmission line of the display substrate and a touch lead of the touch panel. The signal transmission line of the display substrate at least includes a first power supply line (VDD), a second power supply line (VSS) and multiple data transmission lines, wherein the plurality of data transmission lines are configured to connect a data line of the display region 100 in a fanout manner, the first power supply line VDD is configured to connect a high-level power supply line of the display substrate and the second power supply line VSS is configured to connect a low-level power supply line of the display substrate. A pair of touch leads of the touch panel are configured to correspondingly be connected to multiple pins of the binding pin region 206. The bending region 202 may be provided with a groove configured to bend the second fanout region 203, the antistatic region 204, the driver chip region 205 and the binding pin region 206 to the back of the touch region 100. The second fanout region 203 may be provided with multiple touch leads and multiple data transmission lines which are led out in a fanout manner. The antistatic region 204 may be provided with an antistatic circuit configured to eliminate static electricity. The driver chip region 205 may be provided with a Driver IC (integrated circuit), which is configured to be connected to the plurality of data transmission lines of the second fanout region 203. In some possible implementations, the driver chip region 205 may be provided with a touch and display driver integration (TDDI). The binding pin region 206 may be provided with multiple pins, which are correspondingly connected to the plurality of touch leads and multiple signal transmission lines of a source driving circuit, and are connected to an external control device through a bound flexible printed circuit board (FPC).

In an exemplary embodiment, in a process of preparing the display substrate and the touch panel, a first array test unit 210 and a second array test unit 220 are disposed on one side, of the binding region 200 away from the touch region 100, and each of the first array test unit 210 and the second array test unit 220 includes multiple test terminals (ET Pad) which are correspondingly connected to multiple pins of the binding pin region 206 through interface lines, and are configured to test the display substrate and the touch panel to check whether there is a problems such as short circuit, open circuit, or the like.

In an exemplary embodiment, a first cutting line 601 and a second cutting line 602 are disposed outside the binding region 200. The second cutting line 602 is a fine cutting line which is located at the periphery of the binding region 200 and the second cutting line 602 has a same shape as an outline of the binding region 200. The first cutting line 601 is a rough cutting line which is located at the periphery of the second cutting line 602 and the first cutting line 601 has the same shape as the outline of the second cutting line 602. However, only the second cutting line 602 is provided between the binding region 200 and the first array test unit 210 and the second array test unit 220. At least one first cutting line 601 is further provided on one side of the first array test unit 210 and the second array test unit 220 away from the binding region 200. After a film layer process is completed, cutting equipment cuts along the first cutting line 601 (rough cutting line), and after a test is completed, the cutting equipment cuts along the second cutting line 602 (fine cutting line), such that the display substrate and the touch panel are formed.

Figure 3:
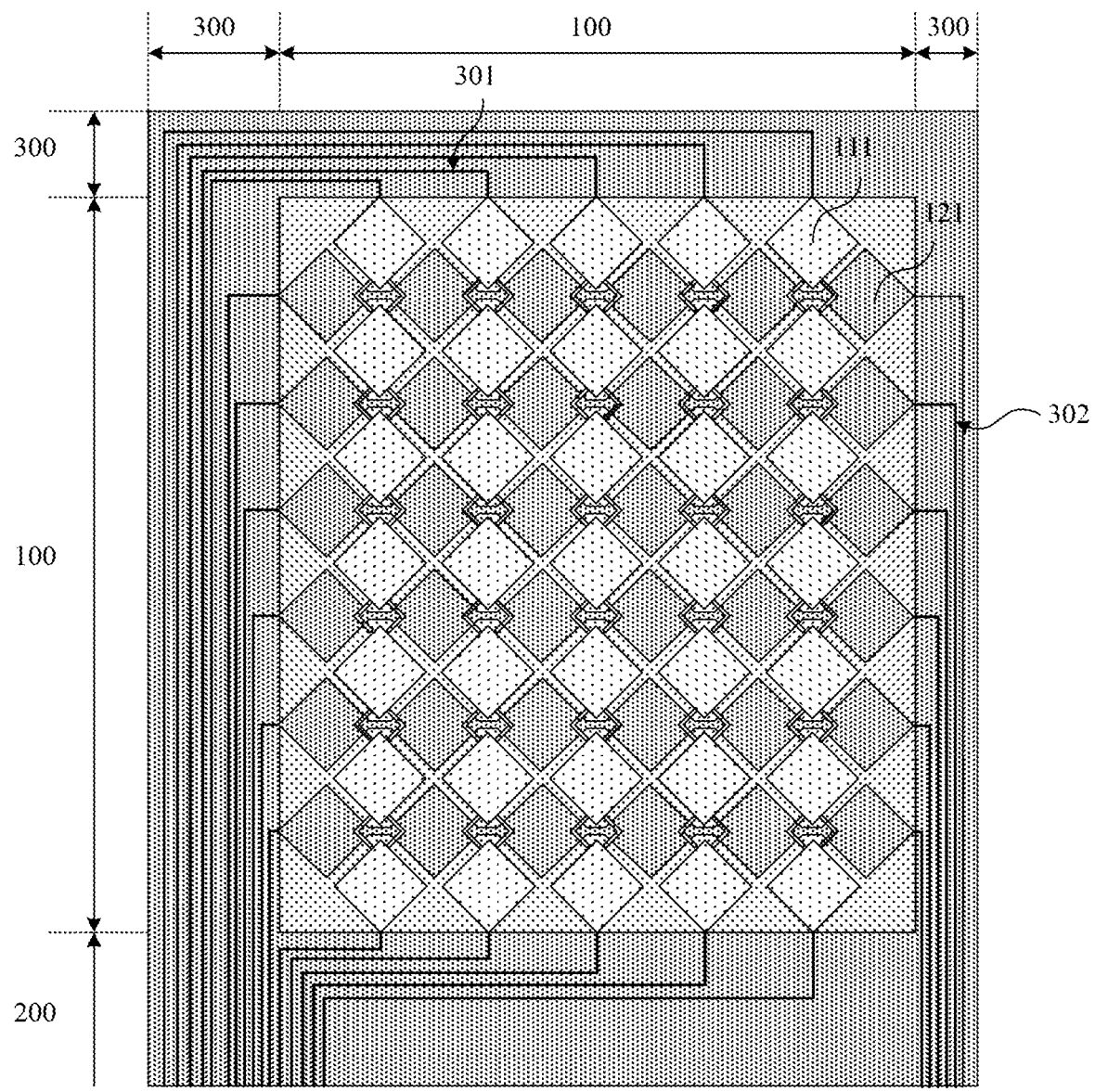
FIG. 3 is a schematic diagram of a structure of an edge region according to an exemplary embodiment of the present disclosure.

FIG. 3 is a schematic diagram of a structure of an edge region according to an exemplary embodiment of the present disclosure. As shown in FIG. 3, in an exemplary embodiment, the edge region 300 is located on one side of the touch region 100 other than the side where the binding region 200 is located. In an exemplary embodiment, the first touch electrodes 111 are driver electrodes (Tx) and the second touch electrodes 123 are sensor electrodes (Rx). In an exemplary embodiment, multiple driving (Tx) leads 301 and multiple sensing (Rx) leads 302 are disposed in the edge region 300, wherein first terminals of the driving leads 301 are connected to the first touch electrodes 111, and second terminals of the driving leads 301 extend along the edge region 300 to the binding region 200. First terminals of the sensing leads 302 are connected to the second touch electrodes 121, and second terminals of the sensing leads 302 extends along the edge region 300 to the binding region 200. The driving leads 301 and the sensing leads 302 together form a touch lead.

In an exemplary embodiment, for touch regions with width-length ratios of 18:9 and 20:9, a 2T1R driving mode may be adopted, that is, driving signals Tx are simultaneously supplied from the top and the bottom (direction of the long-side) through driving leads 301, and receiving signals Rx are supplied from the left side or the right side (direction of the short-side) through sensing leads 302 at one side. In an exemplary embodiment, for a touch region with the width-length ratio of 8:9, i.e. a foldable screen, a 2T2R driving mode can be adopted, that is, the driving signals Tx are simultaneously supplied from the top and the bottom through the driving leads 301, and the receiving signals Rx are simultaneously supplied from the left side and the right side through the sensing leads 302.

In an exemplary embodiment, along a direction parallel to an edge of the binding region (the first direction D1), the edge region 300 includes a first side edge region located on one side of the touch region 100 and a second side edge region located on the other side of the touch region 100, wherein the edge of the binding region is an edge of the binding region close to the touch region. Along a direction perpendicular to the edge of the binding region (the second direction D2), the edge region 300 further includes a third side edge region on one side away from the binding region 200 and a fourth side edge region on one side close to the binding region 200. In the following description, a left edge region refers to the first side edge region, a right edge region refers to the second side edge region, an upper edge region refers to the third side edge region, and a lower edge region refers to the fourth side edge region. In an exemplary embodiment, the lower side edge region may be the first fanout region 201 in the binding region 200, that is, the lower side edge region and the first fanout region 201 are the same region.

In an exemplary embodiment, along the direction parallel to the edge of the binding region (the first direction D1), the binding region 200 includes a first side of the binding region and a second side of the binding region. The first side of the binding region and the first side edge region are the same side, and the second side of the binding region and the second side edge region are the same side. The binding pin region 206 in the binding region 200 includes a first pin region located on the first side of the binding region and a second pin region located on the second side of the binding region. Each of the first pin region and the second pin region may include multiple pins which are configured to be correspondingly connected to multiple touch leads of the touch region 100. In the following description, the left side of the binding region refers to the first side of the binding region, and the right side of the binding region refers to the second side of the binding region.

Figure 4:
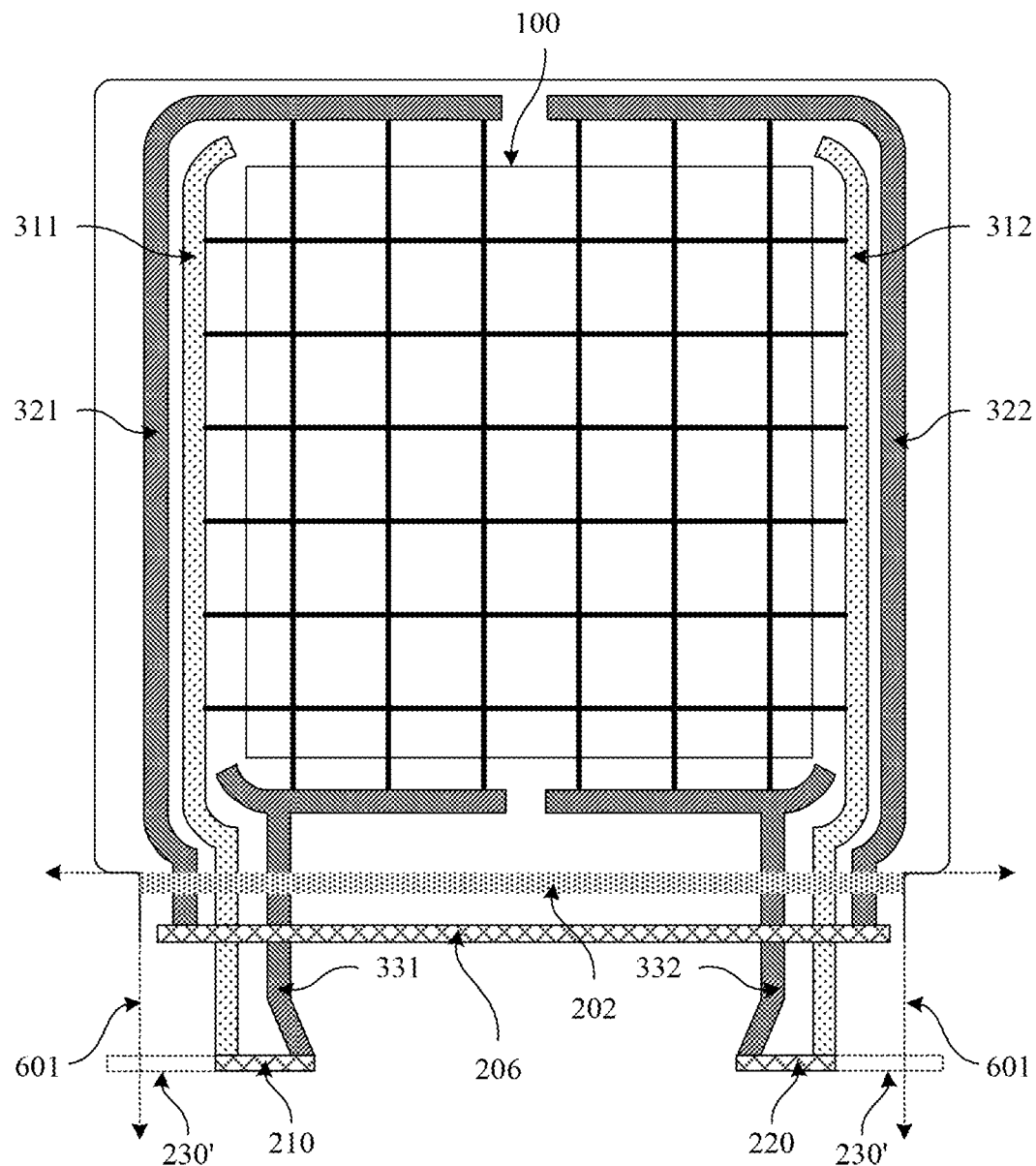
FIG. 4 is a schematic diagram of a structure of a touch lead according to an exemplary embodiment of the present disclosure.

FIG. 4 is a schematic diagram of a structure of a touch lead according to an exemplary embodiment of the present disclosure. As shown in FIG. 4, in an exemplary embodiment, the touch region 100 of the touch panel includes M rows of driver electrodes and N columns of sensor electrodes, wherein M and N are positive integers greater than 2. In an exemplary embodiment, for a touch region with a width of X in the up-down direction and a width of Y in the left-right direction, the driver electrodes may be provided in a direction with a larger width and the sensor electrodes may be provided in a direction with a smaller width. For example, when Y is larger than X, the width in the left-right direction is larger, therefore the driver electrodes are provided in the left-right (row) direction and the sensor electrodes are provided in the up-down (column) direction.

In an exemplary embodiment, for the M rows of driver electrodes, first terminals of M first driving leads 311 are correspondingly connected to first terminals of the M rows of driver electrodes, and second terminals of the M first driving leads 311 extend along the left edge region to the left side of the binding region, with the first driving leads 311 as the first row leads. First terminals of M second driving leads 312 are correspondingly connected to second terminals of the M rows of driver electrodes, and second terminals of the M second driving leads 312 extend along the right edge region to the right side of the binding region, with the second driving leads 312 as the second row leads. Therefore, there are M first driving leads 311 in the left edge region, and there are M first driving leads 311 extending to the left side of the binding region. There are M second driving leads 312 in the right edge region, and there are M second driving leads 312 extending to the right side of the binding region.

In an exemplary embodiment, for N columns of sensor electrodes, first terminals of N1 first sensing leads 321 are correspondingly connected to first terminals of N1 columns of sensor electrodes, and the second terminals of the N1 first sensing leads 321 extend from the upper edge region to the left edge region and extend along the left edge region to the left side of the binding region, with the first sensing leads 321 as the first row leads. First terminals of N2 second sensing leads 322 are correspondingly connected to first terminals of N2 columns of sensor electrodes, and second terminals of the N2 second sensing leads 322 extend from the upper edge region to the right edge region and extend along the right edge region to the right side of the binding region, with the second sensing leads 322 as the second row leads. Therefore, there are N1 first sensing leads 321 in the left edge region, and there are N1 first sensing leads 321 extending to the left side of the binding region. There are N2 second sensing leads 322 in the right edge region, there are N2 second sensing leads 322 extending to the right side of the binding region, and N1+N2=N.

In an exemplary embodiment, for the N columns of sensor electrodes, first terminals of N1 third sensing leads 331 are correspondingly connected to second terminals of N1 columns of sensor electrodes, and second terminals of the N1 third sensing leads 331 extend from the lower edge region to the left edge region and extend along the left edge region to the left side of the binding region, with the third sensing leads 331 as the third row leads. First terminals of N2 fourth sensing leads 332 are correspondingly connected to second terminals of N2 columns of sensor electrodes, and second terminals of the N2 fourth sensing leads 332 extend from the lower edge region to the right edge region and extend along the right edge region to the right side of the binding region, with the fourth sensing leads 332 as the fourth row leads. In an exemplary embodiment, the lower edge region is the first fanout region in the binding region. The second terminals of the N1 third sensing leads 331 may directly extend to the left side of the binding region, and the second terminals of the N2 fourth sensing leads 332 may directly extend to the right side of the binding region. Therefore, there are N1 third sensing leads 331 extending to the left side of the binding region, there are N2 fourth sensing leads 332 extending to the right side of the binding region, and N1+N2=N.

In an exemplary embodiment, it is possible that N1=N2, or N1=N2+1, or N1=N2−1.

In an exemplary embodiment, for M rows of driver electrodes*N columns of sensor electrodes, there are M+2*N1 touch leads introduced to the left side of the binding region and M+2*N2 touch leads introduced to the right side of the binding region. For example, for a 34*39 touch panel, there are 34 driving channels, and there are 34 first driving leads 311 in the left edge region and 34 second driving leads 312 in the right edge region. There are 39 sensing channels, and there are 20 first sensing leads 321 in the left edge region, 19 second sensing leads 322, 20 third sensing leads 331 and 19 fourth sensing leads 332 in the right edge region. In this way, there are 34+2*20=74 touch leads introduced to the left side of the binding region and 34+2*19=72 touch leads introduced to the right side of the binding region.

In an exemplary embodiment, the M first driving leads 311, the N1 first sensing leads 321 and the N1 third sensing leads 331 introduced to the left side of the binding region are connected to multiple pins in the first pin region in the binding pin region 206 after passing through the first fanout region 201, the bending region 202, the second fanout region 203, the antistatic region 204 and the driver chip region 205. The M second driving leads 312, the N2 second sensing leads 321 and the N3 fourth sensing leads 331 introduced to the right side of the binding region are connected to multiple pins in the second pin region in the binding pin region 206 after passing through the first fanout region 201, the bending region 202, the second fanout region 203, the antistatic region 204 and the driver chip region 205.

During operation of the touch panel, touch signals are input through multiple pins in the first pin region and multiple pins in the second pin region, and the touch signals are input to each row of driver electrodes through the M first driving leads 311 and the M second driving leads 312, thereby achieving joint driving of each row of driver electrodes. Touch signals are input to the first to N1-th column sensor electrodes through the N1 first sensing leads 321 and the N1 third sensing leads 331, and touch signals are input to the (N1+1)-th to N-th column sensor electrodes through the N2 second sensing leads 322 and the N2 fourth sensing leads 332, thereby achieving joint driving of each column of sensor electrodes. In this way, the 2T2R driving mode during the operation of the touch panel is achieved.

During module (MDL) detection, detection signals are input through multiple pins in the first pin region and multiple pins in the second pin region, and the detection signals are input to each row of driver electrodes through the M first driving leads 311 and the M second driving leads 312, thereby achieving joint detection of each row of driver electrodes. Detection signals are input to the first to N1-th column sensor electrodes through the N1 first sensing leads 321 and the N1 third sensing leads 331, and detection signals are input to the (N1+1)-th to N-th column sensor electrodes through the plurality of N2 second sensing leads 322 and the N2 fourth sensing leads 332, thereby achieving joint detection of each column of sensor electrodes. In this way, the 2T2R detection mode during the module detection is achieved.

In a touch panel, on the one hand, multiple pins of the first pin region are correspondingly connected to the M first driving leads 311, the N1 first sensing leads 321, and the N1 third sensing leads 331 on the left side of the binding region. On the other hand, multiple pins of the first pin region are connected to multiple test terminals of the first array test unit 210 through interface lines, and M+2*N1 touch leads are introduced into the first array test unit 210. On the one hand, multiple pins of the second pin region are correspondingly connected to the M second driving leads 312, the N2 second sensing leads 322, and the N2 fourth sensing leads 332 on the right side of the binding region. On the other hand, multiple pins of the second pin region are connected to multiple test terminals of the second array test unit 220 through interface lines, and M+2*N2 touch leads are introduced into the second array test unit 210. The first array test unit 210 and the second array test unit 220 are configured to test the touch panel through 2M driving leads and 2N sensing leads before the flexible circuit board is bound to the binding pin region 206 to check whether there is a problem such as short circuit, open circuit or the like. Thus, the array test unit can achieve 2T2R detection because all the driving leads and sensing leads are introduced into the array test units. Taking a 34*39 touch panel as an example, in order to realize the test, 74 touch leads are introduced into the first array test unit 210 and 72 touch leads are introduced into the second array test unit 220. Because a large number of touch leads are introduced, the array test units needs more test terminals, thus the test terminals occupy a large space and cause a test terminal region to exceed the cutting lines 601. As shown in FIG. 4, for the L-shaped cutting lines 601 provided in the binding region, because the test terminal regions 230' (denoted by the dashed box) exceeds the cutting lines 601, some test terminals are cut off during cutting. As a result, the array test units after the cutting cannot test all touch electrodes, which increases the risk of defects and reduces the product yield. Although solutions such as reducing a spacing between the test terminals or adjusting the positions of the test terminals can prevent a part of the test terminals from being cut during the cutting, the cost for implementing such solutions is rather high because they require a re-layout of the binding region, a redesign of the mask, and replacement of new array test equipment.

In an exemplary embodiment of the present disclosure, for M rows of driver electrodes*N columns of sensor electrodes, the first pin region of the binding pin region 206 is provided with M+2*N1 pins, and the second pin region is provided with M+2*N2 pins. The M+2*N1 pins in the first pin region are respectively connected to the M first driving leads 311, the N1 first sensing leads 321 and the N1 third sensing leads 331 on the left side of the binding region. The M+2*N2 pins in the second pin region are respectively connected to the M second driving leads 312, the N2 second sensing leads 322 and the N2 fourth sensing leads 332 on the right side of the binding region. In an exemplary embodiment of the present disclosure, the first array test unit 210 is provided with M1+N1 test terminals which are correspondingly connected to M1+N1 pins in the first pin region, and the second array test unit 220 is provided with M2+N2 test terminals, where M1+M2=M, and the test terminals are correspondingly connected to M2+N2 pins in the second pin region.

In an exemplary embodiment, it is possible that M1=M2, or M1=M2+1, or M1=M2−1.

In an exemplary embodiment, the M1+N1 test terminals of the first array test unit 210 may be connected to the M1 first driving leads 311 and the N1 first sensing leads 321 through interface lines and pins in the first pin region, that is, M1 test terminals of the first array test unit 210 are correspondingly connected to the M1 first driving leads 311, and N1 test terminals of the first array test unit 210 are correspondingly connected to the N1 first sensing leads 321. In an exemplary embodiment, the M2+N2 test terminals of the second array test unit 220 may be connected to the M2 second driving leads 312 and the N3 second sensing leads 322 through interface lines and pins in the second pin region, that is, M2 test terminals of the second array test unit 220 are correspondingly connected to the M2 second driving leads 312, and N2 test terminals of the second array test unit 220 are correspondingly connected to the N2 second sensing leads 322.

In an exemplary embodiment, the M1+N1 test terminals of the first array test unit 210 may be connected to the M1 first driving leads 311 and the N1 third sensing leads 331 through interface lines and pins of the first pin region. The M2+N2 test terminals of the second array test unit 220 may be connected to the M2 second driving leads 312 and the N2 fourth sensing leads 332 through interface lines and pins of the second pin region.

In an exemplary embodiment, the M1+N1 test terminals of the first array test unit 210 may be connected to the M1 first driving leads 311 and the N1 first sensing leads 321 through interface lines and pins of the first pin region. The M2+N2 test terminals of the second array test unit 220 may be connected to the M2 second driving leads 312 and the N2 fourth sensing leads 332 through interface lines and pins of the second pin region.

In an exemplary embodiment, the M1+N1 test terminals of the first array test unit 210 may be connected to the M1 first driving leads 311 and the N1 third sensing leads 331 through interface lines and pins of the first pin region. The M2+N2 test terminals of the second array test unit 220 may be connected to the M2 second driving leads 312 and the N2 second sensing leads 322 through interface lines and pins in the second pin region.

In an exemplary embodiment, the M1 first driving leads 311 may be driving leads connected to the first to the M1-th rows of driver electrodes in the touch region 100, and the M2 second driving leads 312 may be driving leads connecting the (M1+1)-th to the M-th rows of driver electrodes in the touch region 100.

In an exemplary embodiment, the M2 second driving leads 312 may be driving leads connected to the first to the M2-th rows of driver electrodes in the touch region 100, and the M1 first driving leads 311 may be driving leads connected to the (M2+1)-th to the M-th rows of driver electrodes in the touch region 100.

During the array test, the first array test unit 210 inputs test signals through the M1 first driving leads 311, and the test signals are input from the first terminals of the first to the M1-th rows of driver electrodes, thus achieving one-side input of drive signals in the first to the M1-th rows. The second array test unit 220 inputs test signals through the M2 second drive leads 312, and the test signals are input from the second terminals of the (M1+1)-th to the M-th rows of driver electrodes, thus achieving one-side input of drive signals in the (M1+1)-th to M-th rows. The first array test unit 210 inputs test signals through the N1 first sensing leads 321, and the test signals are input from the first terminals of the sensor electrodes of the first to the N1-th columns, thus achieving one-side input of the sensing signals in the first to the N1-th columns. The second array test unit 220 inputs test signals through the N2 second sensing leads 322, and the test signals are input from the first terminals of the (N1+1) th to the N-th columns of sensor electrodes, thus achieving one-side input of the sensing signals in the (N1+1) th to the N-th columns. In this way, the 1T1R test mode during array test is achieved.

Taking a 34*39 touch panel as an example, touch leads connected to the first pin region in the binding pin region 206 include: 34 first driving leads 311, 20 first sensing leads 321 and 20 third sensing leads 331. Touch leads connected to the second pin region in the binding pin region 206 include: 34 second driving leads 312, 19 second sensing leads 322 and 19 fourth sensing leads 332. There are 74 pins connected to the touch leads in the first pin region and there are 72 pins connected to the touch leads in the second pin region. However, only 37 test terminals are provided in the the first array test unit 210, only 36 test terminals are provided in the second array test unit 220. The number of test terminals provided in the test unit is far less than the number of pins provided in the binding pin region.

In an exemplary embodiment, among the 37 test terminals provided in the first array test unit 210, 20 test terminals are connected to 20 first sensing leads 321 or connected to 20 third sensing leads 331, and 17 test terminals are connected to 17 first driving leads 311. Among the 36 test terminals provided in the second array test unit 220, 19 test terminals are connected to 19 second sensing leads 322 or connected to 19 fourth sensing leads 332, and 17 test terminals are connected to 17 second driving leads 312. In an exemplary embodiment, the 17 first driving leads 311 may be driving leads connected to the 1st to 17th rows of driver electrodes in the touch region 100, and the 17 second driving leads 312 may be driving leads connected to the 18th to the 34th rows of driver electrodes in the touch region 100. Or, the 17 second driving leads 312 may be driving leads connected the 1st to the 17th rows of driver electrodes in the touch region 100, and the 17 first driving leads 311 may be driving leads connected to the 18th to the 34th rows of driver electrodes in the touch region 100.

In this way, 37 touch leads are introduced into the first array test unit 210 and 36 touch leads are introduced into the second array test unit 220. Since there are a relatively small number of touch leads introduced into the array test units, the number of test terminals required in the array test unit and the space occupied by the test terminals are effectively reduced, so that the test terminals will not exceed the cutting lines 601. As shown in FIG. 4, since the test terminal regions (shown by the box filled with solid grid) does not exceed the cutting line 601s, all test terminals can be kept without being cut off during cutting, so that the array test units can test all touch electrodes, thus reducing the risk of defects and improving the product yield. Compared with solutions such as reducing the spacing between the test terminals or adjusting the positions of the test terminals, solution of an exemplary embodiment of the present disclosure does not require a re-layout of the binding region or replacement of new array test equipment, which effectively reduces the implementation cost.

An exemplary embodiment of the present disclosure provides a touch panel. After touch leads of the touch panel extend to a binding region, all the touch leads are connected to pins of the binding pin region, and a part of touch leads are connected to an array test unit. The touch panel uses a 2T2R driving mode during operation, a 2T2R detection mode during module detection, and a 1T1R test mode during array test. Because the array test unit is connected to a part of touch leads, the number of test terminals required by the array test unit and the space occupied by the test terminals in the array test unit are effectively reduced, the test terminals are not cut off during the cutting, so that the array test unit can test all touch electrodes, thereby reducing the risk of defects and improving the product yield, which effectively reduces the implementation cost.

Figure 5:
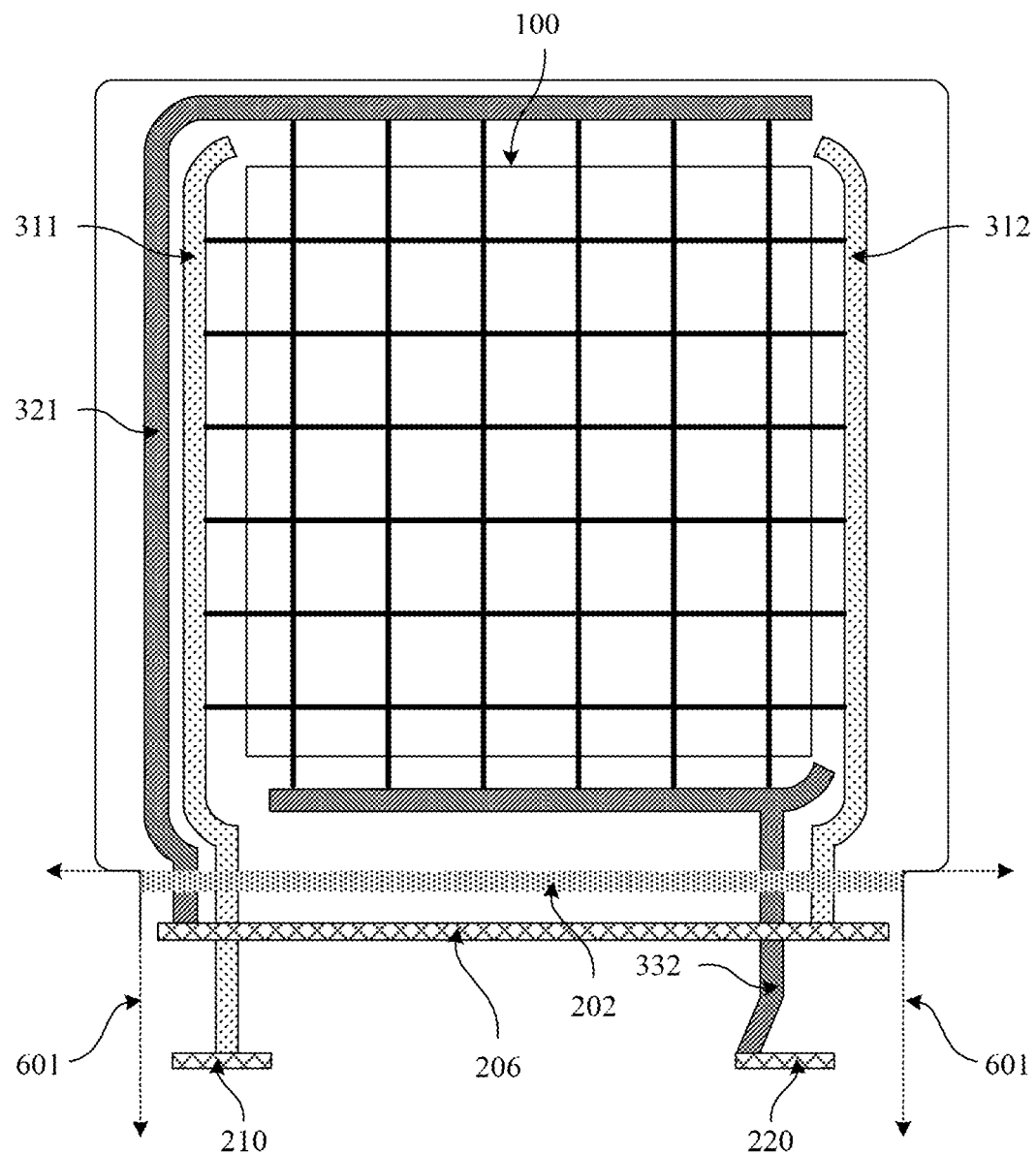
FIG. 5 is a schematic diagram of a structure of another touch lead according to an exemplary embodiment of the present disclosure.

FIG. 5 is a schematic diagram of a structure of another touch lead according to an exemplary embodiment of the present disclosure. As shown in FIG. 5, in an exemplary embodiment, the touch region 100 of the touch panel includes M rows of driver electrodes and N columns of sensor electrodes. In an exemplary embodiment, for the M rows of driver electrodes, the structures of M first driving leads 311 located in the left edge region and M second driving leads 312 located in the right edge region are similar to those of the embodiment shown in FIG. 4, with the first driving leads 311 as the first row leads and the second driving leads 312 serving as the second row leads. During operation, the first driving leads 311 and the second driving leads 312 jointly drive each row of driver electrodes.

In an exemplary embodiment, for the N columns of sensor electrodes, first terminals of N first sensing leads 321 are correspondingly connected to first terminals of the N columns of sensor electrodes, and second terminals of the N first sensing leads 321 extend from the upper edge region to the left edge region and extend along the left edge region to the left side of the binding region, with the first sensing leads 321 as the first row leads. First terminals of N fourth sensing leads 332 are correspondingly connected to second terminals of the N columns of sensor electrodes, and second terminals of the N fourth sensing leads 332 extend from the lower edge region to the right edge region and extend along the right edge region to the right side of the binding region. In an exemplary embodiment, the second terminals of the N fourth sensing lead 332 may extend directly to the right side of the binding region, with the fourth sensing leads 332 as the fourth column leads. During operation, the first sensing leads 321 and the fourth sensing leads 332 jointly drive each row of sensor electrodes.

In an exemplary embodiment, for M rows of driver electrodes*N columns of sensor electrodes, M first driving leads 311 and N first sensing leads 321 are disposed in the left edge region, and M second driving leads 312 and N fourth sensing leads 332 are disposed in the right edge region. There are M+N touch leads introduced to the left side of the binding region and there are M+N touch leads introduced to the right side of the binding region. For example, for a 34*39 touch panel, there are 34 driving channels and 39 sensing channels; there are 34 first driving leads 311 and 39 first sensing leads 321 in the left edge region, and there are and 34 second driving leads 312 and 39 fourth sensing leads 322 in the right edge region. In this way, there are 34+39=73 touch leads introduced to the left side of the binding region and there are 34+39=73 touch leads introduced to the right side of the binding region.

In an exemplary embodiment, the M first driving leads 311 and the N first sensing leads 321 introduced to the left side of the binding region are correspondingly connected to multiple pins of the first pin region in the binding pin region 206. The M second driving leads 312 and the N fourth sensing leads 332 introduced to the right side of the binding region are correspondingly connected to multiple pins of the second pin region in the binding pin region 206.

During operation of the touch panel, touch signals are input through multiple pins in the first pin region and the second pin region, and the touch signals are input to each row of driver electrodes through the M first driving leads 311 and the M second driving leads 312, thereby achieving joint driving of each row of driver electrodes. Touch signals are input to each column of sensor electrodes through the N first sensing leads 321 and the N fourth sensing leads 332, thereby achieving jointly driving of each column of sensor electrodes. In this way, the 2T2R driving mode during operation of the touch panel is achieved.

During the module detection, detection signals are input through multiple pins in the first pin region and the second pin region, and the detection signals are input to each row of driver electrodes through the M first driving leads 311 and the M second driving leads 312, thereby achieving joint detection of each row of driver electrodes. Detection signals are input to each column of sensor electrodes through the N first sensing leads 321 and the N fourth sensing leads 332, so as to jointly detect each column of sensor electrodes. In this way, the 2T2R detection mode during the module detection is achieved.

In an exemplary embodiment, for M rows of driver electrodes*N columns of sensor electrodes, the first pin region of the binding pin region 206 of the exemplary embodiment of the present disclosure is provided with M+N pins, wherein the M+N pins are respectively connected to the M first driving leads 311 and the N first sensing leads 321 introduced to the left side of the binding region. The second pin region of the binding pin region 206 is provided with M+N pins, and the M+N pins are respectively connected to the M second driving leads 312 and the N fourth sensing leads 332 introduced to the right side of the binding region.

In an exemplary embodiment, the first array test unit 210 may be provided with M test terminals, and the second array test unit 220 may be provided with N test terminals. The M test terminals of the first array test unit 210 may be connected to the M first driving leads 311 through interface lines and pins of the first pin region, and the N test terminals of the second array test unit 220 may be connected to the N fourth sensing leads 332 through interface lines and pins of the second pin region. During an array test, the first array test unit 210 inputs test signals through the M first driving leads 311, and the test signals are input from the first terminals of driver electrodes in each row, thus achieving one-side input of each row of drive electrodes. The second array test unit 220 inputs test signals through the N fourth sensing leads 332, and the test signals are input from the second terminals of the sensor electrodes in each column, thus achieving one-side input of the sensing signals of each column. In this way, the 1T1R test mode during the array test is achieved.

In an exemplary embodiment, the first array test unit 210 may be provided with N test terminals, and the second array test unit 220 may be provided with M test terminals. The N test terminals of the first array test unit 210 may be connected to the N first sensing leads 321 through interface lines and the pins of the first pin region, and the M test terminals of the second array test unit 220 may be connected to the M second driving leads 312 through interface lines and the pins of the second pin region. During the array test, the first array test unit 210 inputs test signals through the N first sensing leads 321, and the test signals are input from the first terminals of the sensor electrodes in each column, thus achieving one-side input of the sensing signals of each column. The second array test unit 220 inputs test signals through the M second driving leads 312, and the test signals are input from the second terminals of driver electrodes in each row, thus achieving one-side input of each row of drive electrodes. In this way, the 1T1R test mode during the array test is achieved.

Taking a 34*39 touch panel as an example, there are 34 and 39 touch leads introduced into the first array test unit 210 and the second array test unit 220, respectively. The first array test unit 210 is only provided with 34 test terminals, while the second array test unit 220 is only provided with 39 test terminals, which effectively reduces the number of test terminals required by the array test unit and the space occupied by the test terminals. All the test terminals can be kept without being cut off during cutting, so that the array test units can test all touch electrodes, thereby reducing risks of defects, improving the product yield, which effectively reduces the implementation costs.

Figure 6:
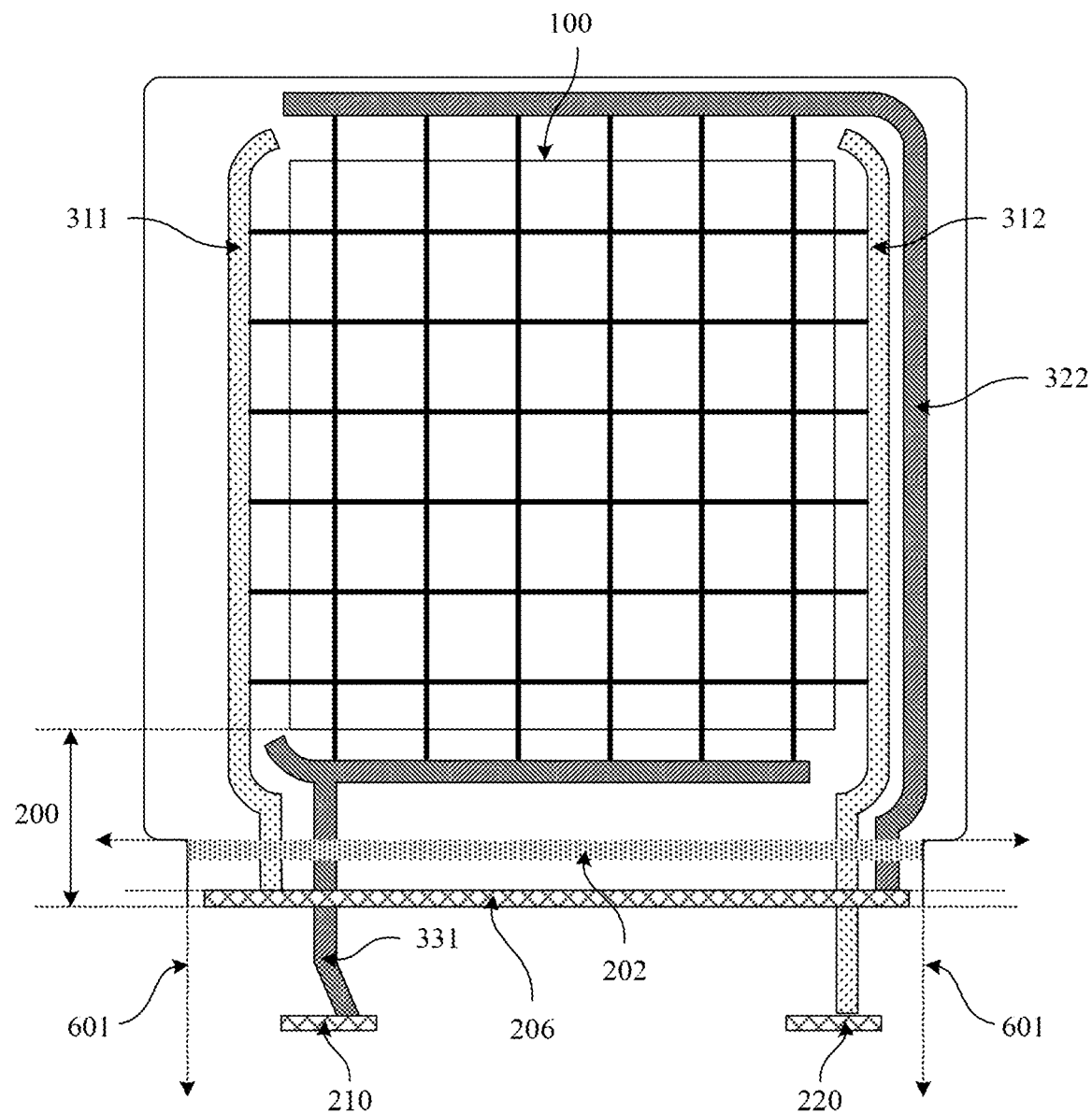
FIG. 6 is a schematic diagram of a structure of another touch lead according to an exemplary embodiment of the present disclosure.

FIG. 6 is a schematic diagram of a structure of another touch lead according to an exemplary embodiment of the present disclosure. As shown in FIG. 6, in an exemplary embodiment, the touch region 100 of the touch panel includes M rows of driver electrodes and N columns of sensor electrodes. In an exemplary embodiment, for the M rows of driver electrodes, the structures of M first driving leads 311 located in the left edge region and M second driving leads 312 located in the right edge region are similar to those of the embodiment shown in FIG. 4, with the first driving leads 311 as the first row leads and the second driving leads 312 as the second row leads. During operation, the first driving leads 311 and the second driving leads 312 jointly drive each row of driver electrodes.

In an exemplary embodiment, for the N columns of sensor electrodes, first terminals of N third sensing leads 331 are correspondingly connected to second terminals of N columns of sensor electrodes, and second terminals of the N third sensing leads 331 directly extend to the left side of the binding region, with the third sensing leads 331 as the third row leads. First terminals of N second sensing leads 322 are correspondingly connected to the first terminals of the N columns of sensor electrodes, and second terminals of the N second sensing leads 322 extend from the upper edge region to the right edge region and extend along the right edge region to the right side of the binding region, with the second sensing leads 322 as the second row leads. During operation, the second sensing lead 322 and the third sensing lead 331 jointly drive each row of sensor electrodes.

In an exemplary embodiment, for M rows of driver electrodes*N columns of sensor electrodes, there are M+N touch leads introduced to the left side of the binding region, and all of the M first driving leads 311 and the N third sensing leads 331 are connected to multiple pins in the first pin region in the binding pin region 206. There are M+N touch leads introduced to the right side of the binding region, and all of the M second driving leads 312 and the N second sensing leads 322 are correspondingly connected to multiple pins in the second pin region of the binding pin region 206.

During operation of the touch panel, touch signals are input through multiple pins in the first pin region and the second pin region, and the touch signals are input to each row of driver electrodes through the M first driving leads 311 and the M second driving leads 312, thereby achieving joint driving of each row of driver electrodes. Touch signals are input to each column of sensor electrodes through the N second sensing leads 322 and the N third sensing leads 331, thereby achieving joint driving of each column of sensor electrodes. In this way, the 2T2R driving mode during operation of the touch panel is achieved. During module detection, detection signals are input through multiple pins in the first pin region and the second pin region, and the detection signals are input to each row of driver electrodes through the M first driving leads 311 and the M second driving leads 312, thereby achieving joint detection of each row of driver electrodes. Test signals are input to each column of sensor electrodes through the N second sensing leads 322 and the N third sensing leads 331, thereby achieving joint detection of each column of sensor electrodes. In this way, the 2T2R detection mode during module detection is achieved.

In an exemplary embodiment, the first array test unit 210 may be provided with N test terminals, and the second array test unit 220 may be provided with M test terminals. The N test terminals of the first array test unit 210 may be connected to the N third sensing leads 331, and the M test terminals of the second array test unit 220 may be connected to the M second driving leads 312. During the array test, the first array test unit 210 inputs test signals through the N third sensing leads 331, and the test signals are input from the second terminals of the sensor electrodes in each column, thus achieving one-side input of sensing signals of each column. The second array test unit 220 inputs test signals through the M second driving leads 312, and the test signals are input from the second terminals of the driver electrodes in each row, thus achieving one-side input of each row of drive electrodes. In this way, the 1T1R test mode during the array test is achieved.

In an exemplary embodiment, the first array test unit 210 may be provided with M test terminals, and the second array test unit 220 may be provided with N test terminals. The M test terminals of the first array test unit 210 may be connected to the M first driving leads 311, and the N test terminals of the second array test unit 220 may be connected to the N second sensing leads 322. During the array test, the first array test unit 210 inputs test signals through the M first driving leads 311, and the test signals are input from the first terminals of the driver electrodes in each row, thus achieving one-side input of each row of drive electrodes. The second array test unit 220 inputs test signals through the N second sensing leads 322, and the test signals are input from the first terminals of the sensor electrodes in each column, thus achieving one-side input of each column of sensing signals. In this way, the 1T1R test mode during the array test is achieved.

Figure 7:
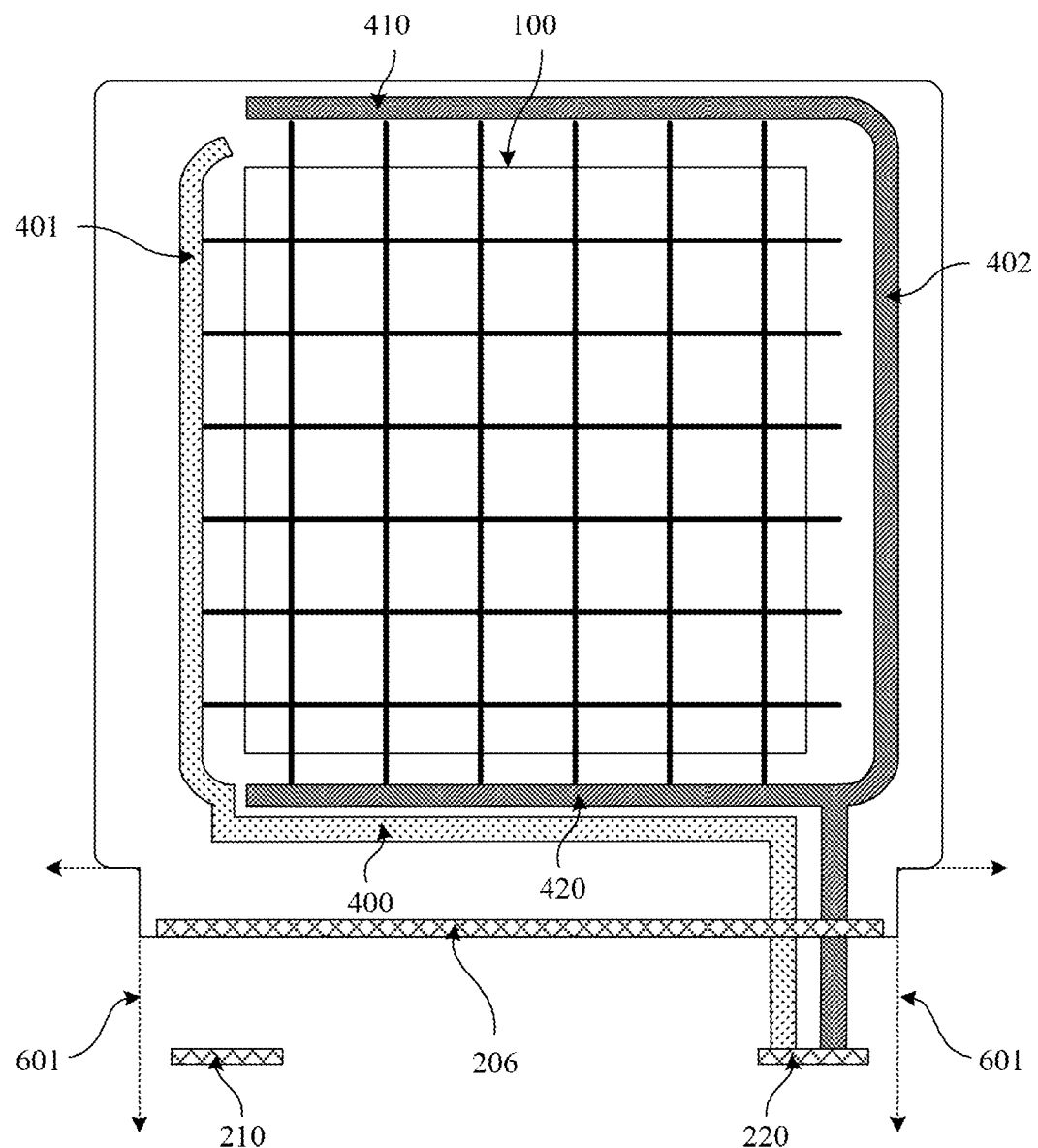
FIG. 7 is a schematic diagram of a structure of another touch lead according to an exemplary embodiment of the present disclosure.

FIG. 7 is a schematic diagram of a structure of another touch lead according to an exemplary embodiment of the present disclosure. As shown in FIG. 7, in an exemplary embodiment, the touch region 100 of the touch panel includes M rows of driver electrodes and N columns of sensor electrodes. M third row leads 401 are disposed in the left edge region, N fifth column leads 402 are disposed in the right edge region, N first terminal leads 410 are disposed in the upper edge region, and N second terminal leads 420 are disposed in the lower edge region. In an exemplary embodiment, first terminals of the M third row leads 401 are correspondingly connected to first terminals of the M rows of driver electrodes, and second terminals of the M third row leads 401 enter the left side of the binding region along the left edge region and extend to the right side of the binding region through the patch cord 400. First terminals of the N first terminal leads 410 are correspondingly connected to first terminals of the N columns of sensor electrodes. Second terminals of the N first terminal leads 410 are correspondingly connected to first terminals of the N fifth column leads 402. First terminals of the N second terminal leads 420 are correspondingly connected to second terminals of the N columns of sensor electrodes. Second terminals of the N second terminal leads 420 are correspondingly connected to the first terminals of the N fifth column leads 402. Second terminals of the N fifth column leads 402 extend along the right edge region to the right side of the binding region.

In an exemplary embodiment, pins of the first pin region in the binding pin region 206 are not connected to touch leads, and multiple pins of the second pin region are correspondingly connected to the M+N touch leads introduced to the right side of the binding region. During operation of the touch panel, touch signals are input through M+N pins in the second pin region, and the touch signals are input to the first terminals of the M rows of driver electrodes through M patch cord 400 and M third row driving leads 401, thereby achieving one-side driving of M rows of driver electrodes. Touch signals are input to the N first terminal leads 410 and the N second terminal leads 420 through the N fifth column leads 402, and the N first terminal leads 410 and N second terminal leads 420 jointly drive the N columns of sensor electrodes. In this way, the 1T2R driving mode during operation of the touch panel is achieved. During the module detection, detection signals are input through the M+N pins in the second pin region, and the detection signals are input to the first terminals of the M rows of driver electrodes through the M patch cord 400 and the M third row driving leads 401, thereby achieving one-side detection of the M rows of driver electrodes. Test signals are input to the N first terminal leads 410 and the N second terminal leads 420 through the N fifth column leads 402, and the N first terminal leads 410 and N second terminal leads 420 jointly detect the N columns of sensor electrodes. In this way, the 1T2R detection mode during the module detection is achieved.

In a touch panel, the first pin region of the binding pin region 206 is connected to multiple touch leads introduced into the left side of the binding region, the second pin region is connected to multiple touch leads introduced into the right side of the binding region, and multiple pins located between the first pin region and the second pin region are connected to signal transmission lines of a source driving circuit. After the flexible printed circuit board (FPC) is bound in the binding pin region 206, an external control device provides a touch signal and a display driving signal through the flexible printed circuit board (FPC) for driving touch and display. Since the first pin region and the second pin region are connected to the driving leads and the sensing leads respectively, the binding pin region 206 needs to be bound with three layers of flexible printed circuit boards, which is not only prone to poor binding, but also incurs high production costs.

In an exemplary embodiment of the present disclosure, only one of the first pin region and the second pin region is connected to touch leads. As shown in FIG. 7, the second pin region of the binding pin region 206 includes M+N pins, and the second pin region is connected to all touch leads. Since the second pin region is connected to the driving leads and the sensing leads at the same time, the binding pin region 206 only needs to be bound with two layers of flexible printed circuit boards, which not only effectively reduces the production costs, but also avoids poor binding and improves the product yield.

In an exemplary embodiment, on the one hand, the second pin region in the binding pin region 206 is connected to M+N touch leads; on the other hand, the second pin region in the binding pin region 206 is correspondingly connected to M+N test terminals in the second test array 220 through interface lines. The M third row leads 401 and the N fifth column leads 402 are introduced into the second array test unit 220, and the first array test unit 210 is not connected to the touch leads. During an array test, the second array test unit 220 inputs test signals through the M third row leads 401 and the N fifth column leads 402, and the test signals are input to each row of driver electrodes from one side and are input to each column of sensor electrodes from both sides, thus achieving the 1T2R test mode during the array test.

Taking a 34*39 touch panel as an example, the touch leads connected to the second pin region in the binding pin region 206 include 34 row leads 401 and 39 column leads, and 73 touch leads are introduced into the second array test unit 220. Although there are many touch leads introduced into the second array test unit 220, since no touch lead is introduced into the first array test unit 210, the first array test unit 210 can increase introduction of a part of display test lines, and the second array test unit 220 can reduce introduction of a part of the display test line, therefore no test terminal needs to be added to the first array test unit 210 and the second array test unit 220, and the test terminal regions will not exceed the cutting lines 601, so that the array test units can test all touch electrodes, thereby reducing the risk of defects and improving the product yield.

In an exemplary embodiment, for the M rows of driver electrodes and the N columns of sensor electrodes included in the touch region 100, the M third row leads 401 and the N fifth column leads 402 may extend to the left side of the binding region, and are correspondingly connected to the pins of the first pin region in the binding pin region 206.

Figure 8:
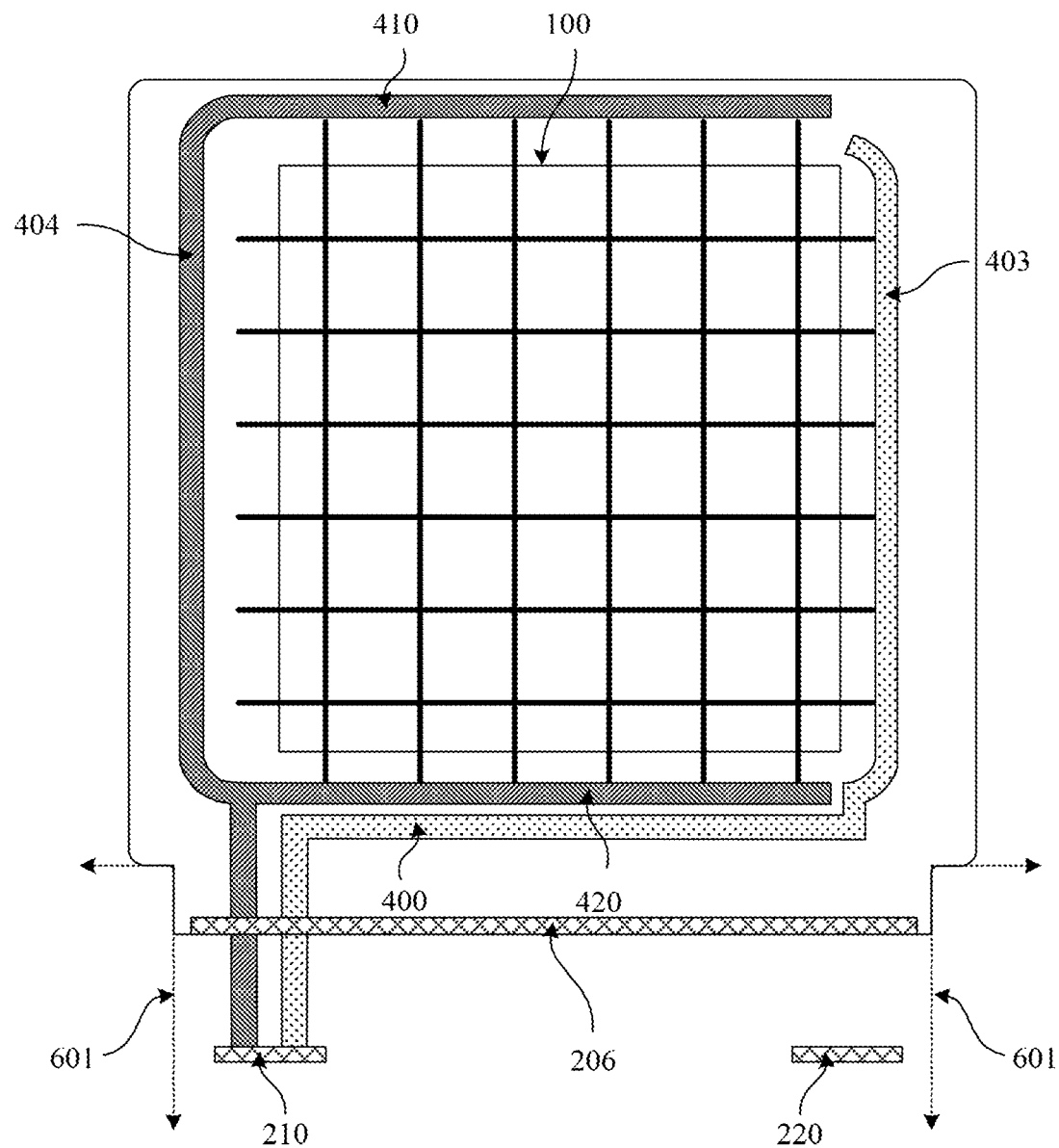
FIG. 8 is a schematic diagram of a structure of another touch lead according to an exemplary embodiment of the present disclosure.

FIG. 8 is a schematic diagram of a structure of another touch lead according to an exemplary embodiment of the present disclosure. As shown in FIG. 8, in an exemplary embodiment, the touch region 100 of the touch panel includes M rows of driver electrodes and N columns of sensor electrodes. N sixth column leads 404 are disposed in the left edge region, M fourth row leads 403 are disposed in the right edge region, N first terminal leads 410 are disposed in the upper edge region, and N second terminal leads 420 are disposed in the lower edge region. In an exemplary embodiment, first terminals of the M fourth row leads 403 are correspondingly connected to second terminals of the M rows of driver electrodes, and second terminals of the M fourth row leads 403 enter the right side of the binding region along the right edge region and extend to the left side of the binding region through a patch cord 400. First terminals of the N first terminal leads 410 are correspondingly connected to first terminals of the N columns of sensor electrodes. Second terminals of the N first terminal leads 410 are correspondingly connected to first terminals of the N sixth column leads 404. the first terminals of the N second terminal leads 420 are correspondingly connected to the second terminals of the N columns of sensor electrodes. Second terminals of the N second terminal leads 420 are correspondingly connected to the first terminals of the N sixth column leads 404. Second terminal of the N sixth column leads 404 extends along the left edge region to the left side of the binding region.

In an exemplary embodiment, pins of the first pin region in the binding pin region 206 are connected to M+N touch leads introduced to the left side of the binding region, while the second pin region is not connected to touch leads. The first array test unit 210 is connected to the M+N touch leads introduced to the left side of the binding region. In this way, 1T2R driving mode is achieved during operation of the touch panel, 1T2R detection mode is achieved during module detection, and 1T2R test mode is achieved during array test.

In an exemplary embodiment, for the M rows of driver electrodes and the N columns of sensor electrodes included in the touch region 100, the N sixth column leads 404 and the M fourth row leads 403 may extend to the right side of the binding region, and are correspondingly connected to the pins of the second pin region in the binding pin region 206.

Figure 9:
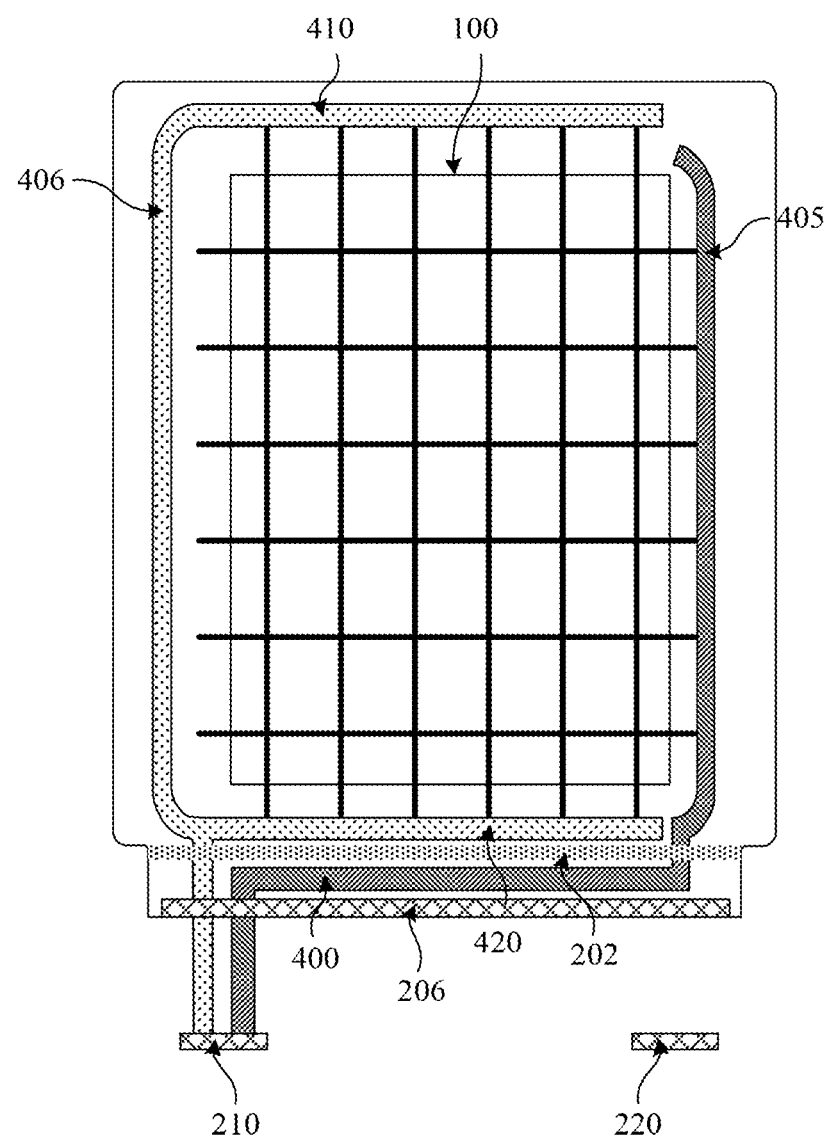
FIG. 9 is a schematic diagram of a structure of another touch lead according to an exemplary embodiment of the present disclosure.

FIG. 9 is a schematic diagram of a structure of another touch lead according to an exemplary embodiment of the present disclosure. As shown in FIG. 9, in an exemplary embodiment, the touch region 100 of the touch panel includes M rows of sensor electrodes and N columns of driver electrodes. N seventh column leads 406 are disposed in the left edge region, M fifth row leads 405 are disposed in the right edge region, N first terminal leads 410 are disposed in the upper edge region, and N second terminal leads 420 are disposed in the lower edge region. In an exemplary embodiment, first terminals of the M fifth row leads 405 are correspondingly connected to second terminals of the M rows of sensor electrodes, and second terminals of the M fifth row leads 405 enter the right side of the binding region along the right edge region and extend to the left side of the binding region through a patch cord 400. First terminals of the N first terminal leads 410 are correspondingly connected to first terminals of the N columns of driver electrodes. Second terminals of the N first terminal leads 410 are correspondingly connected to first terminals of the N seventh column leads 406. First terminals of the N second terminal leads 420 are correspondingly connected to second terminals of the N columns of driver electrodes. Second terminals of the N second terminal leads 420 are correspondingly connected to the first terminals of the N seventh column leads 406. Second terminals of the N seventh column leads 406 extend along the left edge region to the left side of the binding region.

In an exemplary embodiment of the present disclosure, pins of the first pin region in the binding pin region 206 are connected to M+N touch leads introduced to the left side of the binding region, while the second pin region is not connected to touch leads. The first array test unit 210 is connected to the M+N touch leads introduced to the left side of the binding region. During operation of the touch panel, touch signals are input through M+N pins in the first pin region, and the touch signals are input to the second terminals of the M rows of sensor electrodes through M patch cords 400 and the fifth row leads 405. Touch signals are input to the N first terminal leads 410 and the N second terminal leads 420 through the N seventh column leads 402, and the N first terminal leads 410 and N second terminal leads 420 jointly drive the N columns of driver electrodes. In this way, the 2T1R driving mode during operation of the touch panel is achieved. During module detection, detection signals are input through the M+N pins in the first pin region, and the detection signals are input to the second terminals of the M rows of sensor electrodes through M patch cords 400 and the fifth row leads 405. Detection signals are input to the N first terminal leads 410 and the N second terminal leads 420 through the N seventh column leads 402, and the N first terminal leads 410 and N second terminal leads 420 jointly detect the N columns of driver electrodes. In this way, the 2T1R detection mode during module detection is achieved. During an array test, the first array test unit 210 inputs test signals through the M fifth row leads 405 and N seventh column leads 406, thus the 2T1R test mode during the array test is achieved.

In an exemplary embodiment, for the M rows of sensor electrodes and the N columns of driver electrodes included in the touch region 100, the M fifth row leads 405 may be disposed in the left edge region, and the N seventh column leads 406 may be disposed in the right edge region. In an exemplary embodiment, the M fifth row leads 405 and the N seventh column leads 406 may extend to the right side of the binding region, and are correspondingly connected to the pins of the second pin region in the binding pin region 206.

Figure 10:
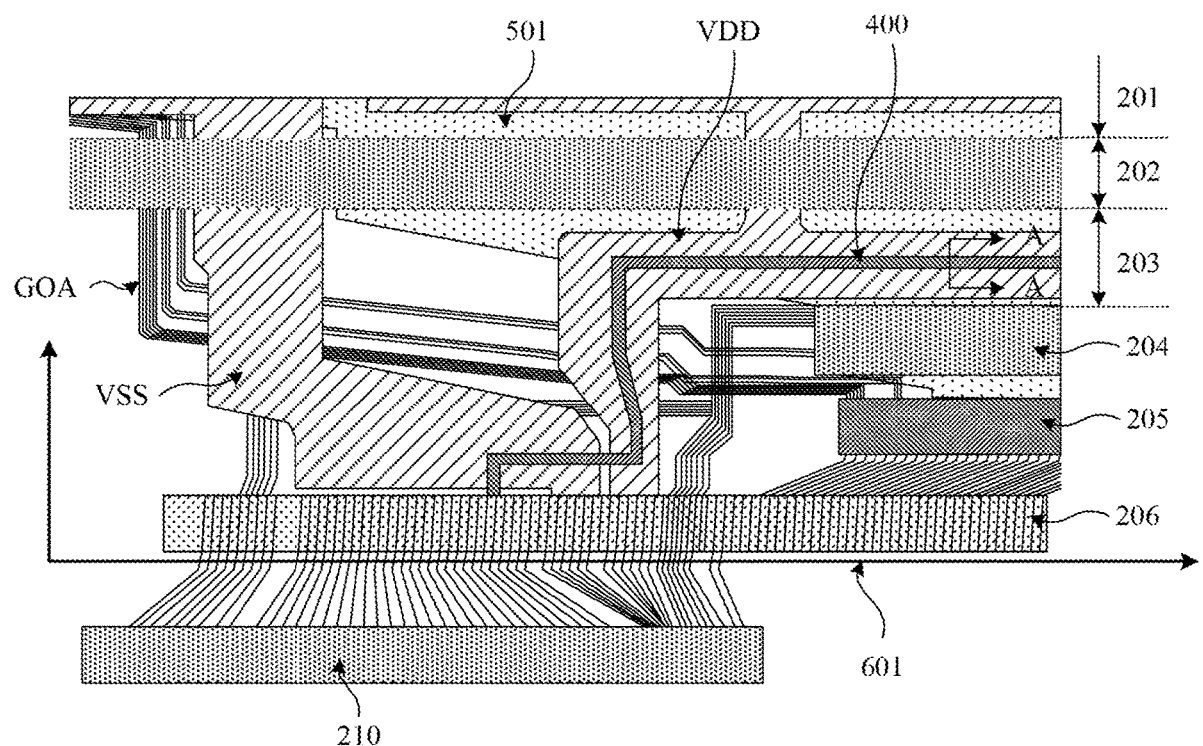
FIG. 10 is a schematic plane view of a structure of a patch cord according to an exemplary embodiment of the present disclosure.

FIG. 10 is a schematic plane view of a structure of a patch cord according to an exemplary embodiment of the present disclosure. In an exemplary embodiment, the binding region may include a first fanout region 201, a bending region 202, a second fanout region 203, an antistatic region 204, a driver chip region 205 and a binding pin region 206. The second fanout region 203 is provided with a first power supply line VDD, a second power supply line VSS, a gate signal transmission line GOA and multiple data transmission lines 501 in a fanout routing mode. The binding pin region 206 is provided with multiple pins which are respectively connected to the first power supply line VDD, the second power supply line VSS, a signal line of the antistatic region 204, a signal line of the driver chip region 205 and multiple touch leads. An array test unit 210 and a first cutting line 601 are further disposed on one side of the bonding pin region 206 away from the bending region 202. As shown in FIG. 10, in an exemplary embodiment, after the touch leads of the touch region enter the right side of the binding region, the touch leads first pass through the bending region 202 on the right side of the binding region, and then extend to the left side of the binding region through patch cords 400, and are correspondingly connected to multiple pins in the first pin region of the binding pin region 206.

In an exemplary embodiment, the patch cords 400 are disposed in a region where the first power supply line VDD is located, and extends from the right side of the binding region to the left side of the binding region along the first power supply line VDD. Since the data transmission lines are disposed in a first source-drain metal layer (SD1), the first power supply line VDD is disposed in a second source-drain metal layer (SD2), and the patch cords 400 are disposed in a touch metal layer, that is, the data transmission lines are located below the first power supply line VDD, and the patch cords 400 are located above the first power supply line VDD, so the first power supply line VDD can serve in shielding, which can shield interference of the data transmission line to the patch cords 400 and interference of the patch cords 400 to the data transmission lines. In an exemplary embodiment, a part of the patch cords 400 may be disposed in a region where the second power supply line VSS is located, and the second power supply line VSS may serve in shielding.

Figure 11:
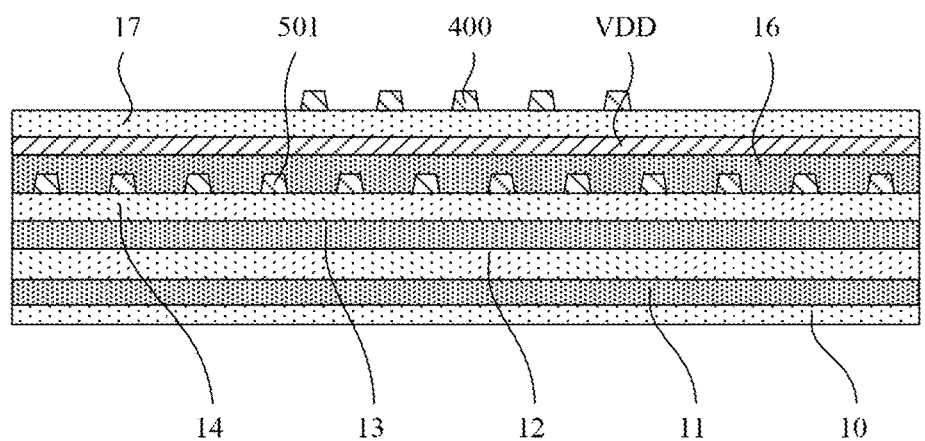
FIG. 11 is a schematic sectional view of a structure of a patch cord according to an exemplary embodiment of the present disclosure.

FIG. 11 is a schematic sectional view of a structure of a patch cord according to an exemplary embodiment of the present disclosure, and it is a cross-sectional view taken along the line A-A in FIG. 10. As shown in FIG. 11, in an exemplary embodiment, in a plane perpendicular to the binding region, a film layer in the region where the patch cords 400 are located in the binding region includes a composite insulating layer disposed on a base substrate 10, wherein the composite insulating layer includes a first insulating layer 11 disposed on the base substrate 10, a second insulating layer 12 disposed on the first insulating layer 11, a third insulating layer 13 disposed on the second insulating layer 12, and a fourth insulating layer 14 disposed on the third insulating layer 13, data transmission lines 501 disposed on the composite insulating layer (the fourth insulating layer 14), a first planarization layer 16 disposed on the data transmission lines 501, a first power supply line VDD disposed on the first planarization layer 16, a second planarization layer 17 disposed on the first power supply line VDD, and patch cords 400 disposed on the second planarization layer 17. In an exemplary embodiment, an orthographic projection of the first power supply line VDD on the base substrate 10 includes an orthographic projection of the patch cords 400 on the substrate 10, so that the first power supply line VDD can shield the interference of the data transmission lines 501 to the patch cords 400 to ensure the reliability of signal transmission. In an exemplary embodiment, the film layer in the region where the patch cords 400 are located may include a fifth insulating layer which is disposed on the data transmission lines 501, and the first planarization layer 16 is disposed on the fifth insulating layer.

Figure 12:
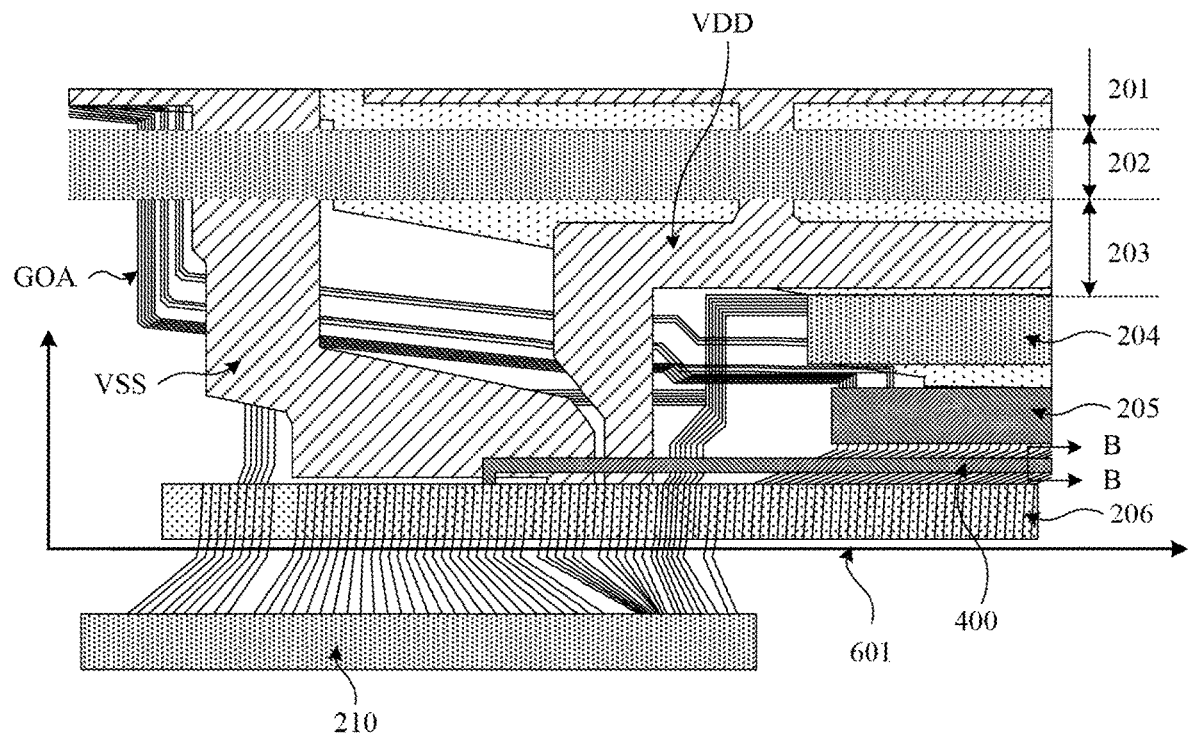
FIG. 12 is a schematic plane view of a structure of another patch cord according to an exemplary embodiment of the present disclosure.

FIG. 12 is a schematic plane view of a structure of another patch cord according to an exemplary embodiment of the present disclosure. As shown in FIG. 12, in an exemplary embodiment, after the touch leads of the touch region enter the right side of the binding region, the touch leads first pass through the bending region 202 and the second fanout region 203 on the right side of the binding region, and then extend to the left side of the binding region through the patch cords 400, and are correspondingly connected to multiple pins in the first pin region of the binding pin region 206.

In an exemplary embodiment, the patch cords 400 extending from the right side of the binding region to the left side of the binding region are disposed in a region between the driver chip region 205 and the bonding pin region 206, wherein the region is referred to as an outer lead bonding (abbreviated as OLB) region. Since signal transmission lines in the OLB region are disposed on a second source-drain metal layer and the patch cords 400 are disposed on a touch metal layer, the patch cords 400 are located above the signal transmission lines in the OLB region, and the patch cords 400 will not affect arrangement of the signal transmission lines in the OLB region.

In an exemplary embodiment, considering that there may be mutual interference between the signal transmission lines in the OLB region and the patch cords 400, the signal transmission lines in OLB region may be disposed on a first source-drain metal layer SD1, and a shielding panel may be disposed on a second source-drain metal layer SD2, so that the signal transmission lines in the OLB region are located below the shielding panel and the patch cords 400 are located above the shielding panel, the shielding panel serve in shielding and shield interference of the signal transmission lines in the OLB region to the patch cords 400 and interference of the patch cords 400 to the signal transmission lines in the OLB region. In an exemplary embodiment, a part of the patch cord 400 may be disposed in a region where the first power supply line VDD and the second power supply line VSS are located, and the first power supply line VDD and the second power supply line VSS may serve in shielding.

Figure 13:
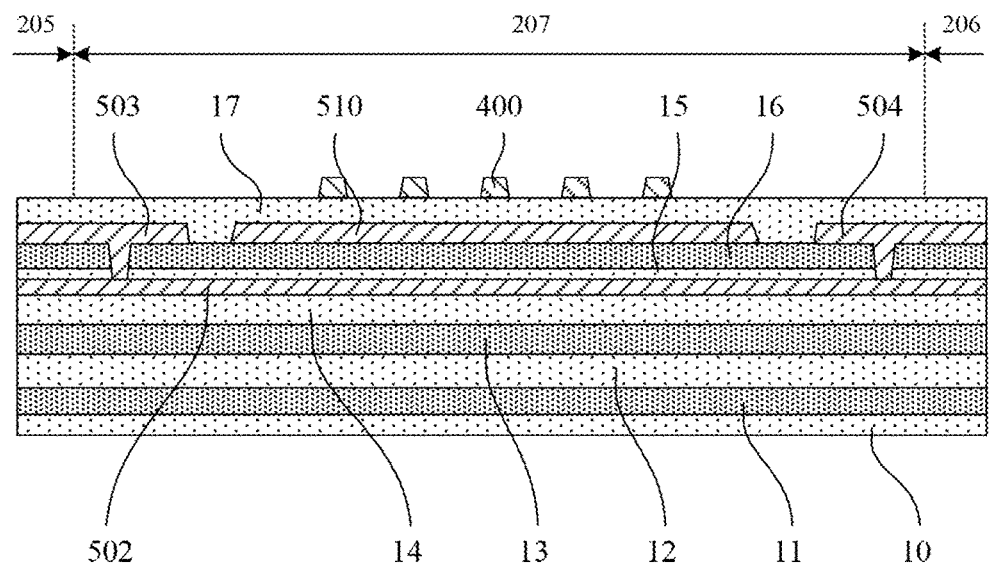
FIG. 13 is a schematic sectional view of a structure of another patch cord according to an exemplary embodiment of the present disclosure.

FIG. 13 is a schematic sectional view of a structure of another patch cord according to an exemplary embodiment of the present disclosure, which is a cross-sectional view taken along B-B in FIG. 12. As shown in FIG. 13, in an exemplary embodiment, in a plane perpendicular to the binding region, a film layer of the OLB region 207 in the binding region includes: a first insulating layer 11 disposed on a base substrate 10; a second insulating layer 12 disposed on the first insulating layer 11; a third insulating layer 13 disposed on the second insulating layer 12; a fourth insulating layer 14 disposed on the third insulating layer 13; a signal connection line 502 disposed on the fourth insulating layer 14; a fifth insulating layer 15 and a first planarization layer 16 disposed on the signal connection line 502, on which vias exposing both terminals of the signal connection line 502 are provided; a first signal transmission line 503, a second signal transmission line 504 and a shielding plate 510 disposed on the first planarization layer 16, wherein the shielding panel 510 is disposed between the first signal transmission line 503 and the second signal transmission line 504, the first signal transmission line 503 and the second signal transmission line 504 are respectively connected to the signal connection line 502 through vias; a second planarization layer 17 disposed on the first signal transmission line 503, the second signal transmission line 504 and the shielding plate 510; and patch cords 400 disposed on the second planarization layer 17. In an exemplary embodiment, the shielding panel 510 is connected to the first power supply line VDD, and an orthographic projection of the shielding panel 510 on the base substrate 10 includes an orthographic projection of the patch cords 400 on the base substrate 10, so that the shielding panel 510 can shield interference of the signal connection cord 502 to the patch cords 400 and interference of the patch cords 400 to the signal connection cord 502, thereby ensuring the reliability of signal transmission.

The following is an exemplary description through a preparation process of the touch panel. A "patterning process" mentioned in the present disclosure includes processes such as photoresist coating, mask exposure, development, etching and photoresist stripping for metal materials, inorganic materials or transparent conductive materials, and includes processes such as coating, mask exposure and development for organic materials. Deposition may be implemented by any one or more of sputtering, evaporation and chemical vapor deposition, the coating may be implemented by any one or more of spraying coating, spin coating and ink-jet printing, and the etching may be implemented by any one or more of dry etching and wet etching, and these are not limited in the present disclosure. A "Thin film" refers to a layer of thin film manufactured by a certain material on a base substrate by using deposition, coating or another process. When the "thin film" does not need a patterning process during the whole preparing process, the "thin film" may be referred to as a "layer". When the "thin film" needs a patterning process throughout the whole manufacturing process, it is referred to as a "thin film" before the patterning process and as a "layer" after the patterning process. The "layer" after the patterning process contains at least one "pattern". In the present disclosure, "A and B are arranged on the same layer" indicates that A and B are simultaneously formed by the same patterning process, and a "thickness" of the film layer is dimension of the film layer in a direction perpendicular to the touch panel. In an exemplary embodiment of the present disclosure, "an orthographic projection of A includes an orthographic projection of B" means that a boundary of the orthographic projection of B falls within a boundary range of the orthographic projection of A, or a boundary of the orthographic projection of A overlaps with a boundary of the orthographic projection of B.

(1) Preparing a base substrate 10 on a glass carrier plate. In an exemplary embodiment of the present disclosure, the base substrate 10 may include a first flexible material layer, a first inorganic material layer, a semiconductor layer, a second flexible material layer and a second inorganic material layer which are stacked on a glass carrier plate. Material of the first flexible material layer and the second flexible material layer may be polyimide (PI), polyethylene terephthalate (PET) or polymer soft film after surface treatment, and material of the first inorganic material layer and the second inorganic material layer may be silicon nitride (SiNx), silicon oxide (SiOx) or the like to improve the water and oxygen resistance capability of the base substrate. The first inorganic material layer and the second inorganic material layers may be called as Barrier layers, and amorphous silicon (a-si) may be used as the material of the semiconductor layer. In an exemplary embodiment, the base substrate 10 may be a hard substrate.

(2) Sequentially depositing a first insulating thin film and an active layer thin film, and patterning the active layer thin film through a patterning process to form a first insulating layer 11 covering the whole base substrate 10 and an active layer patterndisposed on the first insulating layer 11, wherein the active layer pattern at least includes the first active layer formed in the display region.

(3) Sequentially depositing a second insulating thin film and a first metal thin film, and patterning the first metal thin film through a patterning process to form a second insulating layer 12 covering the active layer pattern and a first gate metal layer pattern disposed on the second insulating layer 12, wherein the first gate metal layer pattern includes at least a first gate electrode and a first capacitor electrode formed in the display region.

(4) Sequentially depositing a third insulating thin film and a second metal thin film, patterning the second metal film through a patterning process to form a third insulating layer 13 covering the first gate metal layer and a second gate metal layer pattern disposed on the third insulating layer 13, wherein the second gate metal layer pattern includes at least a second capacitor electrode, and a position of the second capacitor electrode corresponds to a position of a first capacitor electrode formed in the display region.

(5) Depositing a fourth insulating thin film, and patterning the fourth insulating thin film through a patterning process to form a fourth insulating layer 14 covering the second gate metal layer, wherein the fourth insulating layer 14 in the display region is provided with multiple vias, and the plurality of vias at least include two active vias, and the fourth insulating layer 14, the third insulating layer 13 and the second insulating layer 12 in the two active vias are etched away to expose a surface of the first active layer.

Figure 14:
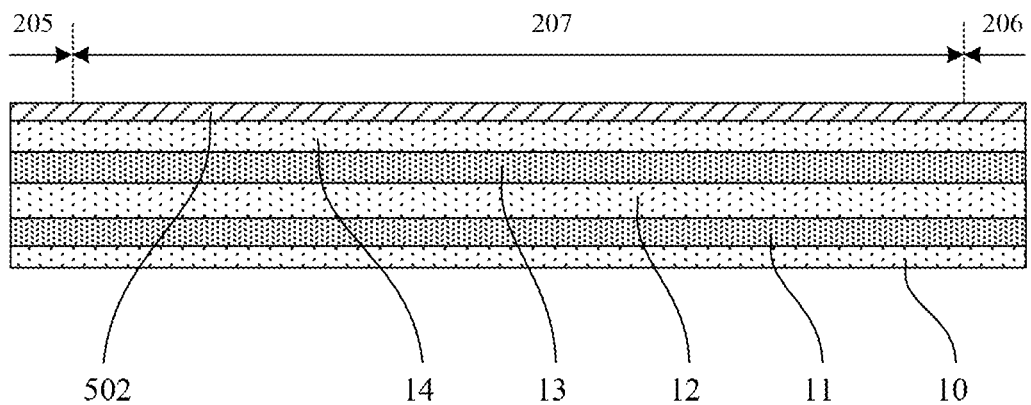
FIG. 14 is a schematic diagram of a display substrate after a pattern of a first source-drain metal layer is formed according to an exemplary embodiment of the present disclosure.

(6) Depositing a third metal thin film, patterning the third metal thin film through a patterning process, and forming a first source-drain metal layer pattern on the fourth insulating layer 14, wherein the first source-drain metal layer at least includes: a first source electrode, a first drain electrode, and a pattern of signal connection line 502. The first source electrode and the first drain electrode are formed in the display region, and are respectively connected to the first active layer through active vias. The signal connection line 502 is formed in the OLB region 207 of the binding region, as shown in FIG. 14.

In an exemplary embodiment, since the OLB region 207 is provided with multiple patch cords extending in a direction parallel to the binding pin region 206, the signal transmission line connected to the terminals of the driver chip region 205 and the pins of the binding pin region 206 needs to pass through the OLB region 207. In an exemplary embodiment of the present disclosure, the signal connection line 502 is configured to be connected to a signal transmission line formed subsequently, so that the signal transmission line of the driver chip region 205 and the signal transmission line of the binding pin region 206 are connected through the signal connection line 502, thus ensuring signal transmission.

Figure 15:
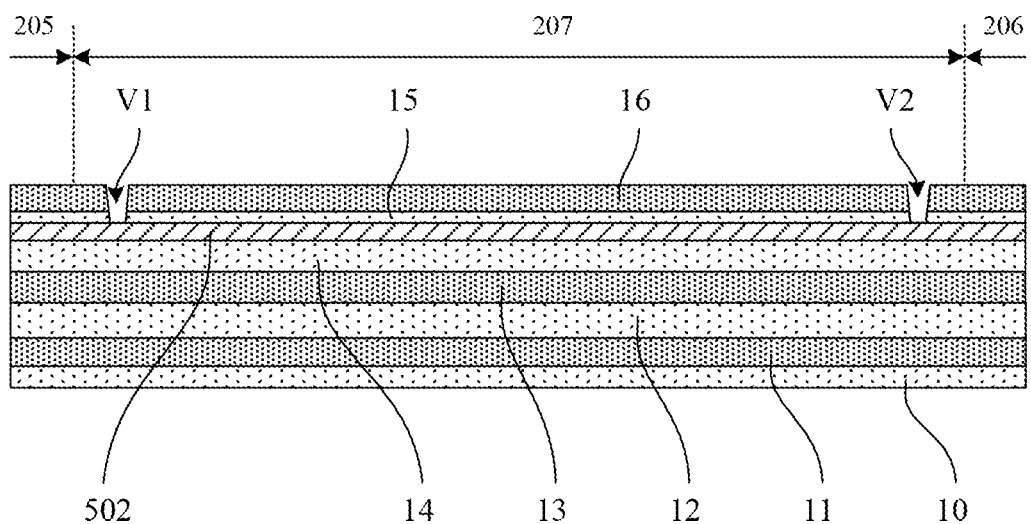
FIG. 15 is a schematic diagram of a display substrate after a pattern of a first planarization layer is formed according to an exemplary embodiment of the present disclosure.

(7) On the base substrate 10 with the above pattern, first depositing a fifth insulating thin film, and then coating a first flat thin film of organic material to form a fifth insulating layer 15 covering the whole base substrate 10 and a first planarization layer 16 disposed on the fifth insulating layer 15, then forming a first connection via V1 and a second connection via V2 through a patterning process. The first planarization layer 16 and the fifth insulating layer 15 in the first connection via V1 and the second connection via V2 are removed. The first connection via V1 exposes a first terminal of the signal connection line 502 adjacent to the driver chip region 205, which is configured to be connected to a first signal transmission line formed subsequently; the second connection via V2 exposes a second terminal of the signal connection line 502 adjacent to the binding pin region 206, which is configured to be connected to a second signal transmission line formed subsequently, as shown in FIG. 15.

In an exemplary embodiment, the first planarization layer and the fifth insulating layer of the display region may form a via exposing the first drain electrode. In an exemplary embodiment, only the fifth insulating layer or only the first planarization layer may be formed in this process.

Figure 16:
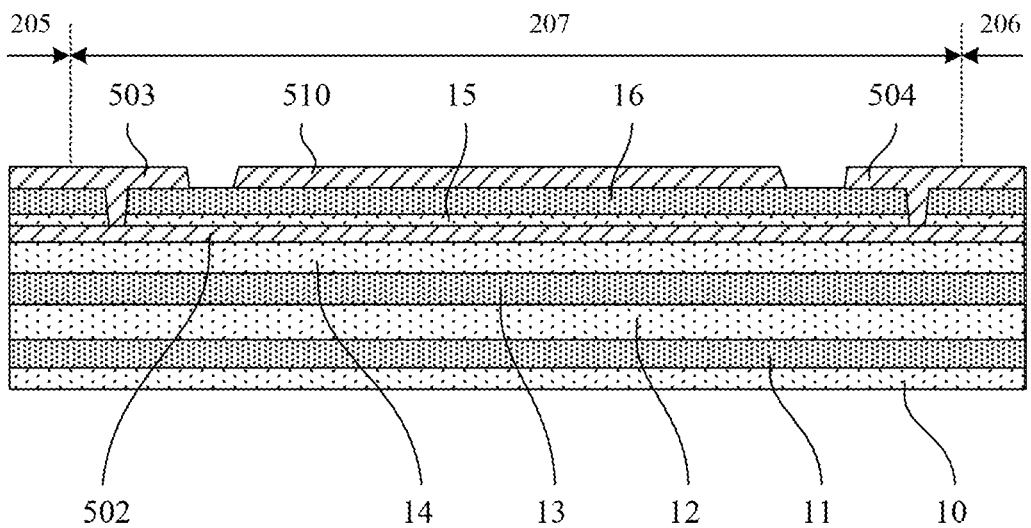
FIG. 16 is a schematic diagram of a display substrate after a pattern of a second source-drain metal layer is formed according to an exemplary embodiment of the present disclosure.

(8) Depositing a fourth metal thin film on the substrate with the above pattern, patterning the fourth metal thin film by a patterning process, and forming a second source-drain metal layer pattern on the first planarization layer 16, wherein the second source-drain metal layer at least includes: the first signal transmission line 503, the second signal transmission line 504 and the shielding panel 510. One terminal of the first signal transmission line 503 away from the OLB region 207 is connected to a terminal of the driver chip region 205, and one terminal of the first signal transmission line located in the OLB region 207 is connected to the first terminal of the signal connection line 502 through the first connection via. One terminal of the second signal transmission line 504 away from the OLB region 207 is connected to a pin of the binding pin region 206, and one terminal of the second signal transmission line located in the OLB region 207 is connected to the second terminal of the signal connection line 502 through the second connection via. The shielding panel 510 is disposed between the first signal transmission line 503 and the second signal transmission line 504, and is configured to provide a shielding function for the patch cord formed subsequently, as shown in FIG. 16.

In this way, a signal connection line structure connecting the first signal transmission line 503 and the second signal transmission line 504 is formed in the OLB region 207. Outside the OLB region 207, the signal transmission line is in the second source-drain metal layer SD2, and within the OLB region 207, the signal transmission line is in the first source-drain metal layer SD1.

In an exemplary embodiment, the second source-drain metal layer pattern may include a first power supply line VDD and a second power supply line VSS, and the shielding panel 510 may be connected to the first power supply line VDD or the second power supply line VSS.

(9) Forming a second planarization layer 17 covering the first signal transmission line 503, the second signal transmission line 504, and the shielding panel 510 on the base substrate 10 formed with the aforementioned pattern. Then, after sequentially forming an anode, a pixel definition layer, an organic light emitting layer, a cathode and an encapsulation layer in the display region, depositing a fifth metal thin film, and patterning the fifth metal thin film by a patterning process to form a touch metal layer pattern, wherein the touch metal layer at least includes touch electrodes and touch leads formed in the touch region, as well as touch leads and patch cords 400 formed in the binding region, wherein multiple patch cords 400 are configured so that the touch leads extend from the right side of the binding region to the left side of the binding region, and are correspondingly connected to multiple pins of the first pin region in the binding pin region 206, as shown in FIG. 13.

In an exemplary embodiment, the plurality of patch cords 400 may be disposed at intervals, and a boundary of an orthographic projection of the plurality of patch cords 400 on the base substrate is located within a boundary of an orthographic projection of the shielding panel 510 on the base substrate, so that the shielding panel 510 can shield interference of the signal connection line 502 to the patch cords 400 and interference of the patch cords 400 to the signal connection line 502, thus ensuring the reliability of signal transmission.

In an exemplary embodiment, the first insulating layer, the second insulating layer, the third insulating layer, the fourth insulating layer and the fourth insulating layer may be made of any one or more of silicon oxide (SiOx), silicon nitride (SiNx) and silicon oxynitride (SiON), and may be a single layer, multiple layers or a composite layer. The first insulating layer is called a Buffer layer, which is used to improve the water and oxygen resistance capability of the base substrate, the second insulating layer and third insulating layer are called gate insulating (GI) layers, the fourth insulating layer is called an interlayer insulating (ILD) layer, and the fifth insulating layer is called a passivation (PVX) layer. The first metal thin film, the second metal thin film, the third metal thin film, and the fourth metal thin film may be made of metal materials, such as any one or more of silver (Ag), copper (Cu), aluminum (Al), titanium (Ti) and molybdenum (Mo), or an alloy material of the above metals, such as AlNd alloy or MoNb alloy, which may have a single-layer structure or a multilayer composite structure, such as Ti/Al/Ti, etc. The active layer thin film may be made of materials such as amorphous indium gallium zinc oxide (a-IGZO), zinc oxynitride (ZnON), indium zinc tin oxide (IZTO), amorphous silicon (a-Si), polysilicon (p-Si), hexathiophene, or polythiophene, etc. That is, the present disclosure is applicable to transistors that are manufactured based on oxide technology, silicon technology and organic technology.

It can be seen from the structure of the touch panel of the exemplary embodiments of the present disclosure and the preparation process thereof that in the exemplary embodiments of the present disclosure, by providing patch cords in an outer pin bonding region, the touch leads extends from the right side of the binding region to the left side of the binding region. The driving leads and the sensing leads are connected at the same time using only one binding region, and the binding pin region only needs to be bound with two layers of flexible printed circuit board, which effectively reduces the production costs, improves the competitiveness of products, and also avoids poor binding, thereby improving the product yield. In the exemplary embodiments of the present disclosure, the second source-drain metal layer is used to form a shielding panel that provides a shielding function, which avoids the interference of the signal transmission lines in the OLB region to the patch cords and the interference of the patch cords to the signal transmission lines in the OLB region, thus improving the reliability of signal transmission.

The structure and preparation process of the touch panel of the exemplary embodiments of the present disclosure are merely illustrative. In an exemplary embodiment, corresponding structures may be changed and patterning processes may be added or reduced according to actual needs, which is not limited here in the present disclosure.

The present disclosure further provides a preparation method for of a touch panel, the touch panel includes a display region and a binding region located on one side of the display region; wherein, along a direction away from the touch region, the binding region at least includes a first fanout region, a bending region, a second fanout region, a driver chip region and a binding pin region which are sequentially disposed; along a direction parallel to an edge of the binding region, the binding pin region includes a first pin region located on a first side of the binding region and a second pin region located on a second side of the binding region, wherein the edge of the binding region is an edge of the binding region adjacent to the touch region. In an example embodiment, the preparation method includes:

forming multiple patch cords in the second fanout region of the binding region; or, forming the multiple patch cords in an outer lead bonding region between the driver chip region and the binding pin region;

the plurality of patch cords are configured such that first terminals of the plurality of patch cords are correspondingly connected to multiple touch leads extending to the first side of the binding region, and second terminals of the plurality of patch cords extend from the first side of the binding region to the second side of the binding region and are correspondingly connected to a plurality of pins of the second pin region; or, the plurality of patch cords are configured such that the first terminals of the plurality of patch cords are correspondingly connected to a plurality of touch leads extending to the second side of the binding region, and the second terminals of the plurality of patch cords extend from the second side of the binding region to the first side of the binding region and are correspondingly connected to a plurality of pins of the first pin region.

In an exemplary embodiment, forming the plurality of patch cords in the second fanout region of the binding region includes: forming a composite insulating layer on the base substrate; forming a data transmission line on the composite insulating layer; forming a first planarization layer covering the data transmission line; forming a first power supply line on the first planarization layer; forming a second planarization layer covering the first power supply line; and forming the plurality of patch cords on the second planarization layer, wherein an orthographic projection of the first power supply line on the base substrate includes an orthographic projection of the plurality of patch cords on the base substrate.

In an exemplary embodiment, forming the plurality of patch cords in the outer lead bonding region between the driver chip region and the binding pin region includes: forming a composite insulating layer disposed on the base substrate and a first planarization layer disposed on the composite insulating layer; forming a signal transmission line on the first planarization layer; forming a second planarization layer covering the signal transmission line; and forming a plurality of patch cords on the second planarization layer.

In an exemplary embodiment, forming the plurality of patch cords in the outer lead bonding region between the driver chip region and the binding pin region includes: forming a composite insulating layer on the base substrate; forming a signal connection line on the composite insulating layer; forming a first planarization layer covering the signal connection line, which is provided with a first connection via exposing a first terminal of the signal connection line and a second connection via exposing a second terminal of the signal connection line; forming a first signal transmission line, a second signal transmission line and a shielding panel on the first planarization layer, wherein one terminal of the first signal transmission line away from the outer lead bonding region is connected to a terminal of the driver chip region, and the other terminal is connected to the first terminal of the signal connection line through the first connection via; one terminal of the second signal transmission line away from the outer lead bonding region, is connected to a pin of the binding pin region, and the other terminal is connected to the second terminal of the signal connection line through the second connection via; the shielding panel is disposed between the first signal transmission line and the second signal transmission line; forming a second planarization layer covering the first signal transmission line, the second signal transmission line and the shielding panel; and forming the patch cords on the second planarization layer; wherein an orthographic projection of the shielding panel on the base substrate includes an orthographic projection of the patch cords on the base substrate.

The present disclosure further provides a display apparatus including the touch panel of the aforementioned embodiments. The display apparatus may be any product or component with a display function such as a mobile phone, a tablet computer, a television, a display, a laptop computer, a digital photo frame, a navigator, etc.

The drawings of the present document only refer to structures involved in the present disclosure, and other structures may refer to general designs. The embodiments of the present disclosure, i.e., the features in the embodiments may be combined with each other to obtain a new embodiment if there is no conflict.

Those of ordinary skills in the art will appreciate that modifications or equivalent substitutions may be made to the technical solutions of the present disclosure without departing from the spirit and scope of the technical solutions of the present application, all of which shall be included within the scope of the claims of the present application.

What is claimed is:

1. A touch panel, comprising
a touch region,
a binding region on one side of the touch region, and
an edge region on other side of the touch region, wherein
the touch region at least comprises M rows of first touch units and N columns of second touch units, the binding region at least comprises a binding pin region, and the edge region at least comprises a plurality of touch leads;
first terminals of the plurality of touch leads are respectively connected to the M rows of first touch units and the N columns of second touch units, and second terminals of the plurality of touch leads extend to the binding region and are correspondingly connected to a plurality of pins of the binding pin region; and
M and N are positive integers greater than 2;
wherein along a direction parallel to an edge of the binding region, the binding pin region comprises a first pin region located on a first side of the binding region and a second pin region located on a second side of the binding region;
the edge of the binding region is an edge of the binding region adjacent to the touch region;
a part of touch leads in the edge region extend to the first side of the binding region and are correspondingly connected to a plurality of pins of the first pin region or the second pin region, and another part of touch leads in the edge region extend to the second side of the binding region and are correspondingly connected to a plurality of pins of the first pin region or the second pin region;
the touch panel further comprises a first array test unit and a second array test unit which are located on one side of the binding pin region away from the touch region;
a plurality of test terminals in the first array test unit are correspondingly connected to a plurality of pins of the first pin region, and a plurality of test terminals in the second array test unit are correspondingly connected to a plurality of pins of the second pin region;
the plurality of touch leads extending to the first side of the binding region and correspondingly connected to the plurality of pins of the first pin region comprise: M first row leads, N1 first column leads, and N1 third column leads, the M first row leads are correspondingly connected to first terminals of the M rows of first touch units in the touch region, the N1 first column leads are correspondingly connected to first terminals of the N1 columns of second touch units in the touch region, and the N1 third column leads are correspondingly connected to second terminals of the N1 columns of second touch units in the touch region;
the plurality of touch leads extending to the second side of the binding region and correspondingly connected to the plurality of pins of the second pin region comprise: M second row leads, N2 second column leads, and N2 fourth column leads, the M second row leads are correspondingly connected to second terminals of the M rows of first touch units in the touch region, the N2 second column leads are correspondingly connected to first terminals of N2 columns of second touch units in the touch region, and the N2 fourth column leads are correspondingly connected to second terminals of the N2 columns of second touch units in the touch region, and N1+N2=N;
the pins correspondingly connected to the first array test unit comprise: pins in the first pin region which are connected to M1 first row leads and the N1 first column leads; or, pins in the first pin region which are connected to the M1 first row leads and the N1 third column leads; and
the pins correspondingly connected to the second array test unit comprise: pins in the second pin region which are connected to M2 second row leads and N2 second column leads; or, pins in the second pin region which are connected to the M2 second row leads and N2 fourth column leads, and M1+M2=M.

2. The touch panel of claim 1, wherein
the N1 first column leads and the N1 third column leads are leads connected to first to N1-th columns of the second touch units in the touch region, and the N2 second column leads and the N2 fourth column leads are leads connected to (N1+1)-th to N-th columns of the second touch units from in the touch region; and
the M1 first row leads are leads connected to first to M1-th rows of the first touch units in the touch region, and the M2 second row leads are leads connected to (M1+1)-th to M-th rows of the first touch units in the touch region; or, the M2 second row leads are leads connected to the first to M2-th rows of the first touch units in the touch region, and the M1 first row leads are leads connected to (M2+1)-th to the M-th rows of the first touch units in the touch region.

3. A display apparatus comprising the touch panel of claim 1.

* * * * *